(12) United States Patent
Madam

(10) Patent No.: US 7,730,391 B2
(45) Date of Patent: Jun. 1, 2010

(54) INK THICKNESS RENDERING FOR ELECTRONIC ANNOTATIONS

(75) Inventor: Vikram Madam, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 859 days.

(21) Appl. No.: 11/563,111

(22) Filed: Nov. 24, 2006

(65) Prior Publication Data

US 2007/0089051 A1    Apr. 19, 2007

Related U.S. Application Data

(63) Continuation of application No. 09/605,878, filed on Jun. 29, 2000, now Pat. No. 7,234,108.

(51) Int. Cl.
*G06F 17/00* (2006.01)

(52) U.S. Cl. .................................. 715/233; 715/268

(58) Field of Classification Search ............... 715/234, 715/233, 230, 231, 232, 268; 345/470
See application file for complete search history.

(56) References Cited

U.S. PATENT DOCUMENTS

| | | | |
|---|---|---|---|
| 5,146,552 A | 9/1992 | Cassoria et al. | |
| 5,237,648 A | 8/1993 | Mills et al. | |
| 5,239,466 A | 8/1993 | Morgan et al. | |
| RE34,476 E | 12/1993 | Norwood | |
| 5,347,295 A | 9/1994 | Agulnick et al. | |
| 5,390,138 A | 2/1995 | Milne et al. | |
| 5,434,929 A | 7/1995 | Beernink et al. | |
| 5,434,965 A | 7/1995 | Matheny et al. | |
| 5,471,568 A | 11/1995 | Webb et al. | |
| 5,559,942 A | 9/1996 | Gough et al. | |
| 5,572,643 A | 11/1996 | Judson | |
| 5,623,679 A | 4/1997 | Rivette et al. | |
| 5,625,833 A | 4/1997 | Levine et al. | |
| 5,630,125 A | 5/1997 | Zellweger | |
| 5,632,022 A | 5/1997 | Warren et al. | |
| 5,644,674 A | 7/1997 | Aihara et al. | |
| 5,666,113 A | 9/1997 | Logan | |
| 5,680,636 A | 10/1997 | Levine et al. | |
| 5,682,439 A | 10/1997 | Beernink et al. | |
| 5,687,331 A | 11/1997 | Volk et al. | |
| 5,689,717 A | 11/1997 | Pritt | |
| 5,717,860 A | 2/1998 | Graber et al. | |

(Continued)

FOREIGN PATENT DOCUMENTS

EP    0 342 838 A    8/1989

(Continued)

OTHER PUBLICATIONS

Landay, et al., "Making Sharing Pervasive: Ubiquitous Computing for Shared Note Taking," IBM Systems Journal, vol. 38, No. 4, 1999, pp. 531-550.

(Continued)

*Primary Examiner*—Laurie Ries

(57) ABSTRACT

A system and method for rendering ink annotations for a displayed image is disclosed. The invention adjusts the thickness of rendered lines for ink annotations when rendered. Ink annotations are created by capturing and connecting a set of data points input by a user. The invention outlines various pixels and weights saturation of anti-aliasing pixels to improve a user's viewing experience.

28 Claims, 15 Drawing Sheets

U.S. PATENT DOCUMENTS

| | | |
|---|---|---|
| 5,717,879 A | 2/1998 | Moran et al. |
| 5,719,595 A | 2/1998 | Hoddie et al. |
| 5,727,129 A | 3/1998 | Barrett et al. |
| 5,729,687 A | 3/1998 | Rothrock et al. |
| 5,737,599 A | 4/1998 | Rowe et al. |
| 5,745,116 A | 4/1998 | Pisutha-Arnold |
| 5,760,773 A | 6/1998 | Berman et al. |
| 5,761,485 A | 6/1998 | Munyan |
| 5,761,683 A | 6/1998 | Logan et al. |
| 5,784,058 A | 7/1998 | LaStrange et al. |
| 5,786,814 A | 7/1998 | Moran et al. |
| 5,790,818 A | 8/1998 | Martin |
| 5,801,685 A | 9/1998 | Miller et al. |
| 5,801,687 A | 9/1998 | Peterson et al. |
| 5,802,516 A | 9/1998 | Shwarts et al. |
| 5,819,301 A | 10/1998 | Rowe et al. |
| 5,821,925 A | 10/1998 | Carey et al. |
| 5,822,720 A | 10/1998 | Bookman et al. |
| 5,826,025 A | 10/1998 | Gramlich |
| 5,832,263 A | 11/1998 | Hansen et al. |
| 5,835,092 A | 11/1998 | Bourdreau et al. |
| 5,838,313 A | 11/1998 | Hou et al. |
| 5,838,914 A | 11/1998 | Carleton et al. |
| 5,845,262 A | 12/1998 | Nozue et al. |
| 5,854,630 A | 12/1998 | Nielsen |
| 5,860,074 A | 1/1999 | Rowe et al. |
| 5,862,395 A | 1/1999 | Bier |
| 5,877,757 A | 3/1999 | Baldwin et al. |
| 5,893,126 A | 4/1999 | Drews et al. |
| 5,893,132 A | 4/1999 | Huffman et al. |
| 5,918,236 A | 6/1999 | Wical |
| 5,920,694 A | 7/1999 | Carleton et al. |
| 5,923,326 A | 7/1999 | Bittinger et al. |
| 5,924,104 A | 7/1999 | Earl |
| 5,931,912 A | 8/1999 | Wu et al. |
| 5,933,139 A | 8/1999 | Feigner |
| 5,933,140 A | 8/1999 | Stranhorn et al. |
| 5,937,416 A | 8/1999 | Menzel |
| 5,940,080 A | 8/1999 | Ruehle et al. |
| 5,948,040 A | 9/1999 | DeLornne et al. |
| 5,950,214 A | 9/1999 | Rivette et al. |
| 5,956,034 A | 9/1999 | Sachs et al. |
| 5,978,818 A | 11/1999 | Lin |
| 5,982,370 A | 11/1999 | Kamper |
| 5,983,248 A | 11/1999 | DeRose et al. |
| 5,986,665 A | 11/1999 | Wrey et al. |
| 6,011,537 A | 1/2000 | Slotznick |
| 6,012,055 A | 1/2000 | Campbell et al. |
| 6,018,334 A | 1/2000 | Eckerberg et al. |
| 6,018,342 A | 1/2000 | Bristor |
| 6,018,344 A | 1/2000 | Harada et al. |
| 6,018,742 A | 1/2000 | Herbert, III |
| 6,025,841 A | 2/2000 | Finkelstein et al. |
| 6,034,689 A | 3/2000 | White et al. |
| 6,035,330 A | 3/2000 | Astiz et al. |
| 6,037,934 A | 3/2000 | Himmel et al. |
| 6,038,598 A | 3/2000 | Danneels |
| 6,049,812 A | 4/2000 | Bertram et al. |
| 6,052,514 A | 4/2000 | Gill et al. |
| 6,054,990 A | 4/2000 | Tran |
| 6,055,538 A | 4/2000 | Kessenich et al. |
| 6,064,384 A | 5/2000 | Ho |
| 6,072,490 A | 6/2000 | Bates et al. |
| 6,076,917 A | 6/2000 | Wen |
| 6,081,829 A | 6/2000 | Sidana |
| 6,091,930 A | 7/2000 | Mortimer et al. |
| 6,094,197 A | 7/2000 | Buxton et al. |
| 6,105,044 A | 8/2000 | DeRose et al. |
| 6,122,649 A | 9/2000 | Kanerva et al. |
| 6,133,925 A | 10/2000 | Jaremko et al. |
| 6,141,007 A | 10/2000 | Lebling et al. |
| 6,144,375 A | 11/2000 | Jain et al. |
| 6,144,991 A | 11/2000 | England |
| 6,151,622 A | 11/2000 | Fraenkel et al. |
| 6,154,771 A | 11/2000 | Rangan et al. |
| 6,157,381 A | 12/2000 | Bates et al. |
| 6,163,778 A | 12/2000 | Fogg et al. |
| 6,181,344 B1 | 1/2001 | Tarpenning et al. |
| 6,184,886 B1 | 2/2001 | Bates et al. |
| 6,195,679 B1 | 2/2001 | Bauersfeld et al. |
| 6,195,694 B1 | 2/2001 | Chen et al. |
| 6,199,082 B1 | 3/2001 | Ferrel et al. |
| 6,205,419 B1 | 3/2001 | Fielder |
| 6,205,455 B1 | 3/2001 | Umen et al. |
| 6,211,871 B1 | 4/2001 | Himmel et al. |
| 6,230,171 B1 | 5/2001 | Pacifici et al. |
| 6,243,071 B1 | 6/2001 | Shwarts et al. |
| 6,243,091 B1 | 6/2001 | Berstis |
| 6,266,772 B1 | 7/2001 | Suzuki |
| 6,271,840 B1 | 8/2001 | Finseth et al. |
| 6,272,484 B1 | 8/2001 | Martin et al. |
| 6,279,005 B1 | 8/2001 | Zellweger |
| 6,279,014 B1 | 8/2001 | Schilit et al. |
| 6,289,126 B1 | 9/2001 | Ishisada |
| 6,289,362 B1 | 9/2001 | Van Der Meer |
| 6,301,590 B1 | 10/2001 | Slow et al. |
| 6,320,169 B1 | 11/2001 | Clothier |
| 6,320,577 B1 | 11/2001 | Alexander |
| 6,321,244 B1 | 11/2001 | Liu et al. |
| 6,331,866 B1 | 12/2001 | Eisenberg |
| 6,331,867 B1 | 12/2001 | Eberhard et al. |
| 6,340,980 B1 | 1/2002 | Ho |
| 6,356,287 B1 | 3/2002 | Ruberry et al. |
| 6,369,811 B1 | 4/2002 | Graham et al. |
| 6,370,497 B1 | 4/2002 | Knowles |
| 6,377,983 B1 | 4/2002 | Cohen et al. |
| 6,389,434 B1 | 5/2002 | Rivette et al. |
| 6,393,422 B1 | 5/2002 | Wone |
| 6,397,264 B1 | 5/2002 | Stasnick et al. |
| 6,405,221 B1 | 6/2002 | Levine et al. |
| 6,418,421 B1 | 7/2002 | Hurtado et al. |
| 6,421,065 B1 | 7/2002 | Waldent et al. |
| 6,425,525 B1 | 7/2002 | Swiminathan et al. |
| 6,433,790 B1 | 8/2002 | Taylor et al. |
| 6,437,793 B1 | 8/2002 | Kaasila |
| 6,437,807 B1 | 8/2002 | Berquist et al. |
| 6,446,110 B1 | 9/2002 | Lection et al. |
| 6,457,013 B1 | 9/2002 | Saxton et al. |
| 6,460,058 B2 | 10/2002 | Koppolu et al. |
| 6,484,156 B1 | 11/2002 | Gupta et al. |
| 6,486,895 B1 | 11/2002 | Robertson et al. |
| 6,490,603 B1 | 12/2002 | Keenan et al. |
| 6,529,920 B1 | 3/2003 | Arons et al. |
| 6,535,294 B1 | 3/2003 | Arledge, Jr. et al. |
| 6,539,370 B1 | 3/2003 | Chang et al. |
| 6,549,220 B1 | 4/2003 | Hsu et al. |
| 6,549,878 B1 | 4/2003 | Lowry et al. |
| 6,551,357 B1 * | 4/2003 | Madduri ................. 715/235 |
| 6,560,621 B2 | 5/2003 | Barile |
| 6,571,211 B1 | 5/2003 | Dwyer et al. |
| 6,571,295 B1 | 5/2003 | Sidana |
| 6,573,907 B1 | 6/2003 | Madrane |
| 6,585,776 B1 | 7/2003 | Bates et al. |
| 6,590,573 B1 * | 7/2003 | Geshwind ................. 345/419 |
| 6,636,238 B1 | 10/2003 | Amir et al. |
| 6,647,534 B1 | 11/2003 | Graham |
| 6,662,310 B2 | 12/2003 | Lopez et al. |
| 6,687,878 B1 | 2/2004 | Eintracht et al. |
| 6,697,997 B1 | 2/2004 | Fujimura |
| 6,710,790 B1 | 3/2004 | Fagioli |
| 6,714,214 B1 | 3/2004 | DeMello |
| 6,760,884 B1 | 7/2004 | Vertelney et al. |
| 6,772,139 B1 | 8/2004 | Smith |
| 6,788,316 B1 | 9/2004 | Ma et al. |

| | | | |
|---|---|---|---|
| 6,859,909 B1 * | 2/2005 | Lerner et al. ............... | 715/203 |
| 6,871,318 B1 | 3/2005 | Wynblatt et al. | |
| 2001/0031128 A1 | 10/2001 | Manbeck | |
| 2002/0097261 A1 | 7/2002 | Gottfurcht et al. | |
| 2002/0099552 A1 | 7/2002 | Rubin et al. | |
| 2002/0194260 A1 | 12/2002 | Headley et al. | |
| 2005/0060138 A1 | 3/2005 | Wang et al. | |

FOREIGN PATENT DOCUMENTS

| | | |
|---|---|---|
| EP | 0342838 A | 11/1989 |
| EP | 0 822 501 | 2/1998 |
| EP | 0 890 926 A1 | 1/1999 |
| EP | 0 902 378 A2 | 3/1999 |
| WO | 87/01481 | 3/1987 |
| WO | 9620908 | 7/1996 |
| WO | 97/22109 | 6/1997 |
| WO | 98/06054 | 2/1998 |
| WO | 98/09446 | 3/1998 |
| WO | 99/49383 | 9/1999 |

OTHER PUBLICATIONS

Landay, J.A., "Using Note-Taking Appliances for Student to Student Collaboration," 29th Annual Frontiers in Education Conference, IEEE Computer Societym, Nov. 1999, p. Session 12C4/15-15C4/20.

Greenberg, Saul, "A Fisheye Test Editor for Relaxed-WYSIWIS Groupware," CHI 1996 Proceedings, pp. 1-5.

Marshall, C., "Annotation from Paper Books to the Digital Library," ACM International Conf. on Digital Libraries, 1997, pp. 131-140.

"Joke eBook," Jul. 1998, PrimaSoft PC, Inc., Electronic Book Series Version 1.0, pp. 1-5.

Munyan, D. "Everybook, Inc.: Developing the E-Book in Relation to Publishing Standards," Sep. 1998, http://futureprint.kent.edu/articles/munyan01.htm, pp. 1-7.

Chin-Hwa, Kuo et al., "A Synchronization Scheme for Multimedia Annotation," Multimedia Information Networking Laboratory, Tamkang University—Taiwan, IEEE, 1997, pp. 594-598.

T. Hirotsu, et al. "Cmew/U—A Multimedia Web Annotation Sharing System," NNT Network Innovation Laboratories—Japan, IEEE, 1999, pp. 356-359.

International Search Report dated Dec. 10, 2001 in International Application No. PCT/ US 01/ 19919.

Patent Abstracts of Japan, Publication No. 11327789 for Color Display and Electronic Blackboard System, publication date Nov. 30, 1999.

Kristensen, A., "Formsheets and the XML Forms Language" (Mar. 1999).

Dublin Core Resource Types: Structurality Draft: Jul. 24, 1997, Feb. 27, 1998.

Dublin Core Metadata Element Set, Version 1.1: Reference Description, 1999.

Dublin Core Metadata Initiative: User Guide Working Draft Jul. 31, 1998, 1999.

C. Marshall, "Annotation from paper books to the digital library," ACM International Conf. on Digital Libraries, 1997, pp. 131-140.

"Joke eBook," Jul. 1998, PrimaSoft PC, Inc., Electronic Book Series Version 1.0, pp. 1-5.

D. Munyan, "Everybook, Inc: Developing the E-Book in Relation to Publishing Standards." Sep. 1998, http://www.futureprint.kent.edu/articles/munyan0.1htm, pp. 1-7.

PhotoImpact 3.0, Ulead Systems Inc., 1996.

"Explore the Features of the Rocket eBook", Retrieved from wysiwyg://212http://www.rocketebook.com/Products/Tour/index.html, (1998), 1 page.

"Open eBook Forum, Open eBook Publication Structure 1.0", Retrieved from: <http://www.ebxwg.org/oebps/oebps1.0/download/oeb1-oebps.htm>, (Sep. 16, 1999),pp. 1-66.

"Rocket eBook Using the Rocket eBook", http://www.rocketbook.com/Products/Faq/using.html, (1999),2 pages.

"Softbook Press, The Leader in Internet-Enabled Document Distribution and Reading Systems", http://www.softbook.com/consumer/reader.asp, (1999),3 pages.

Adobe, "Adobe Acrobat 3.0 Reader Online Guide", *Adobe Systems, Inc*, (1996),110 pages.

Crespo, Arturo et al., "Responsive Interaction for a Large Web Application: the Meteor Shower Architecture in the WebWriter II Editor", *Computer Networks and ISDN Systems*, (1997),pp. 1507-1517.

Graefe, Christopher et al., "Designing the Muse: A Digital Music Stand for the Symphony Musician", *CHI 96* Available at <portal.acm.org/ft_gateway.cfm?id=238599&type=pdf>,(Apr. 12-18,1996),pp. 436-440.

Schilit, Bill N., et al., "Digital Library Information Appliances", *International Conference on Digital Libraries, '98*, Available at <portal.acm.org/citation.cfm?id=276675.276700>,(1998),pp. 217-226.

* cited by examiner

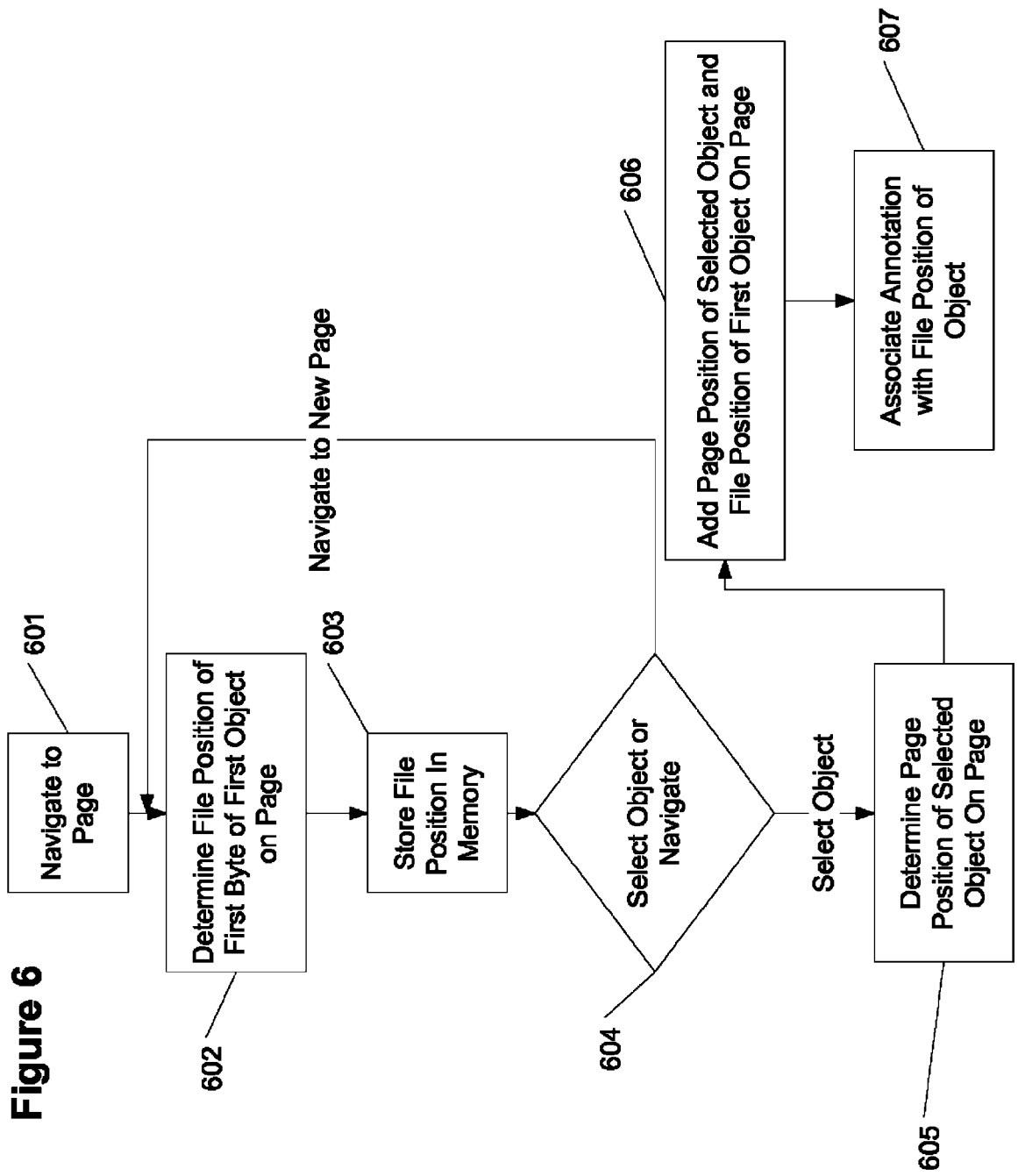

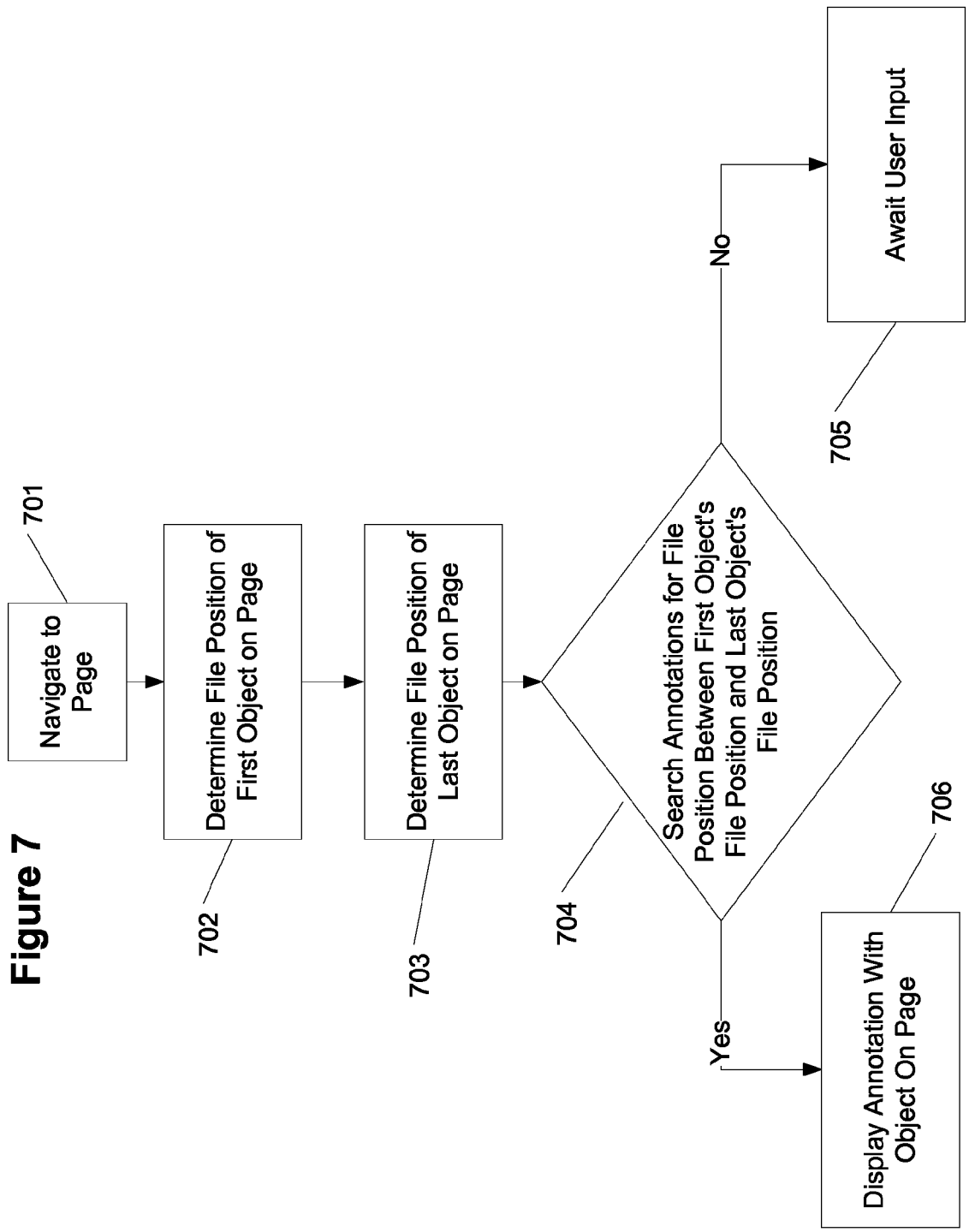

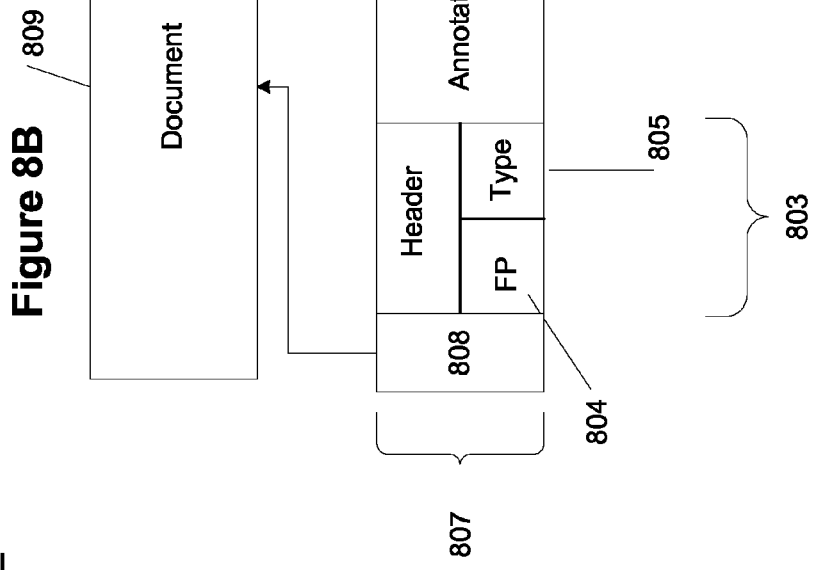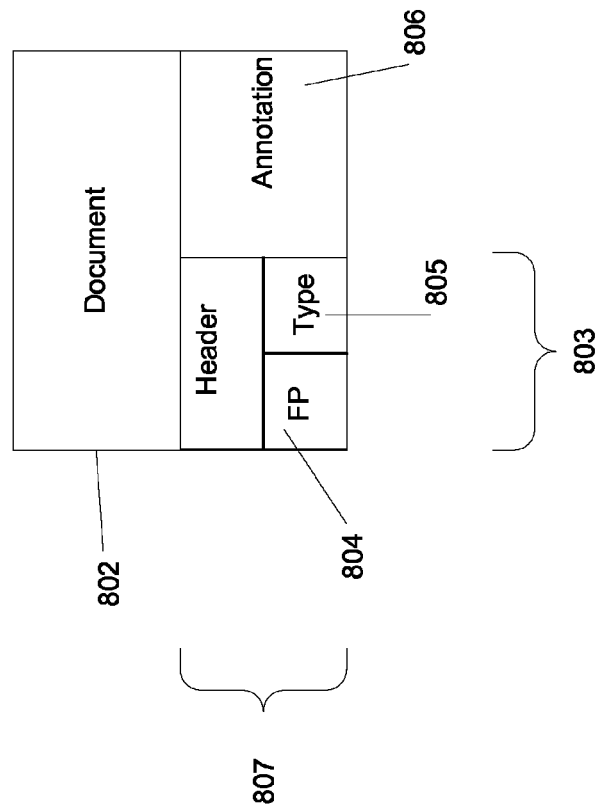

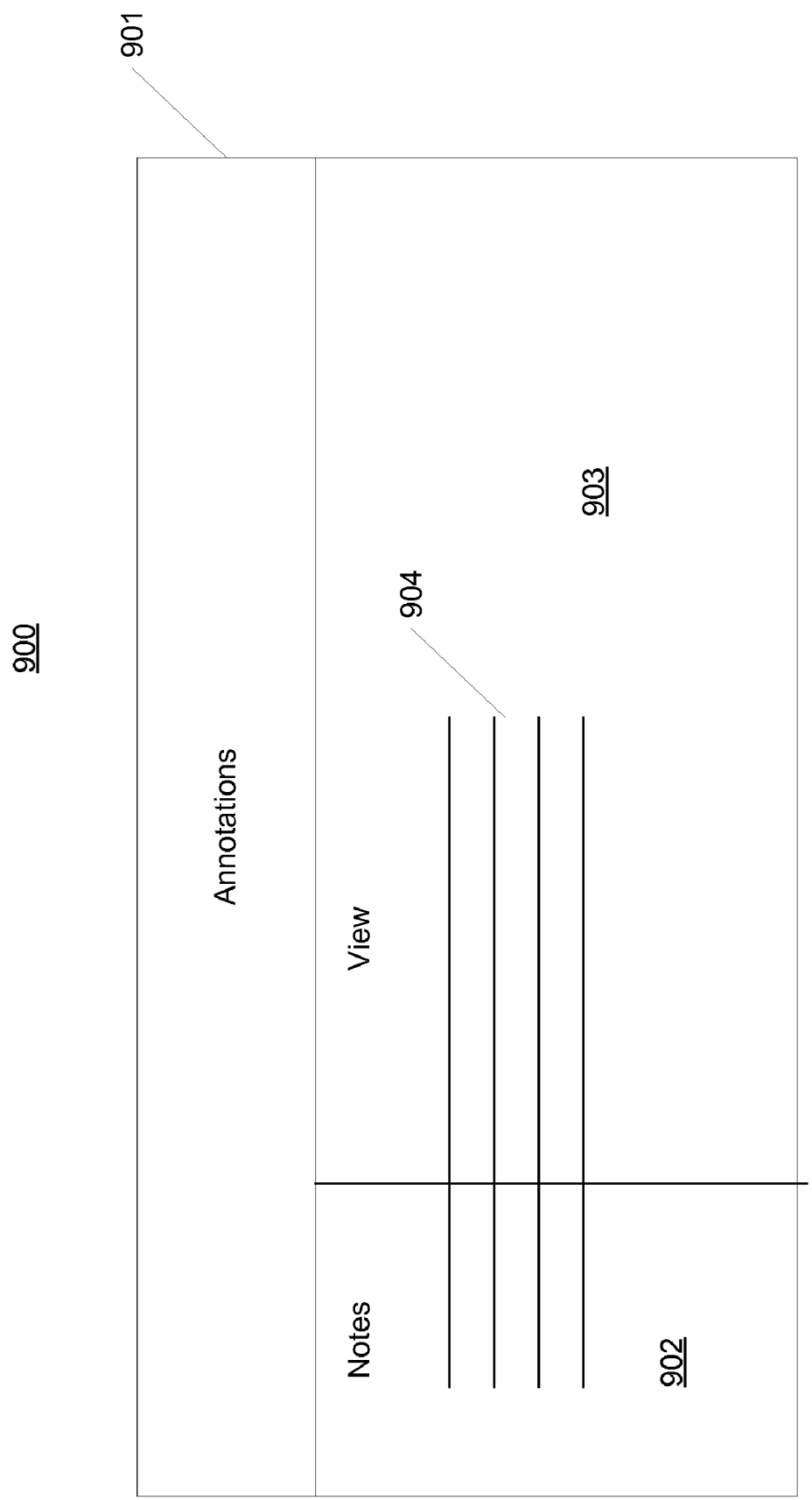

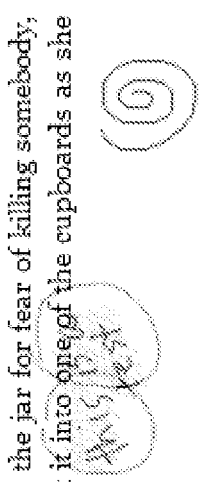
Figure 11E
Figure 11C
Figure 11D
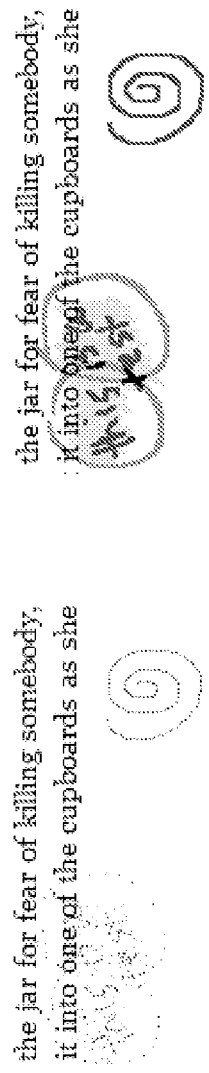
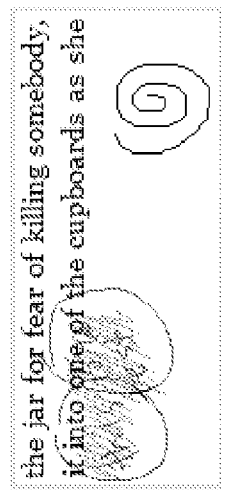
Figure 11A
Figure 11B

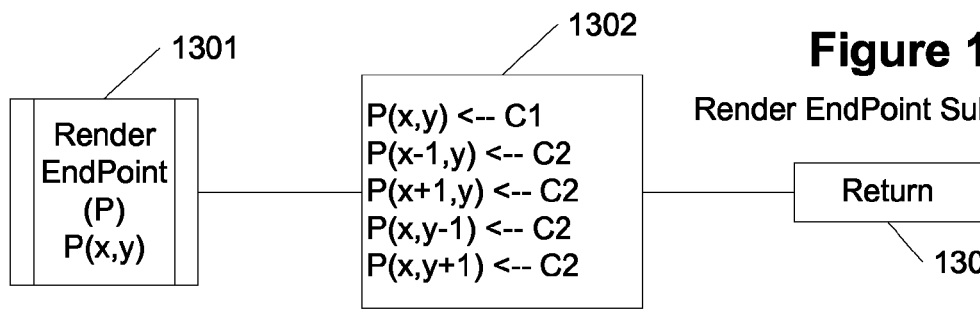
Figure 13
Render EndPoint SubRoutine
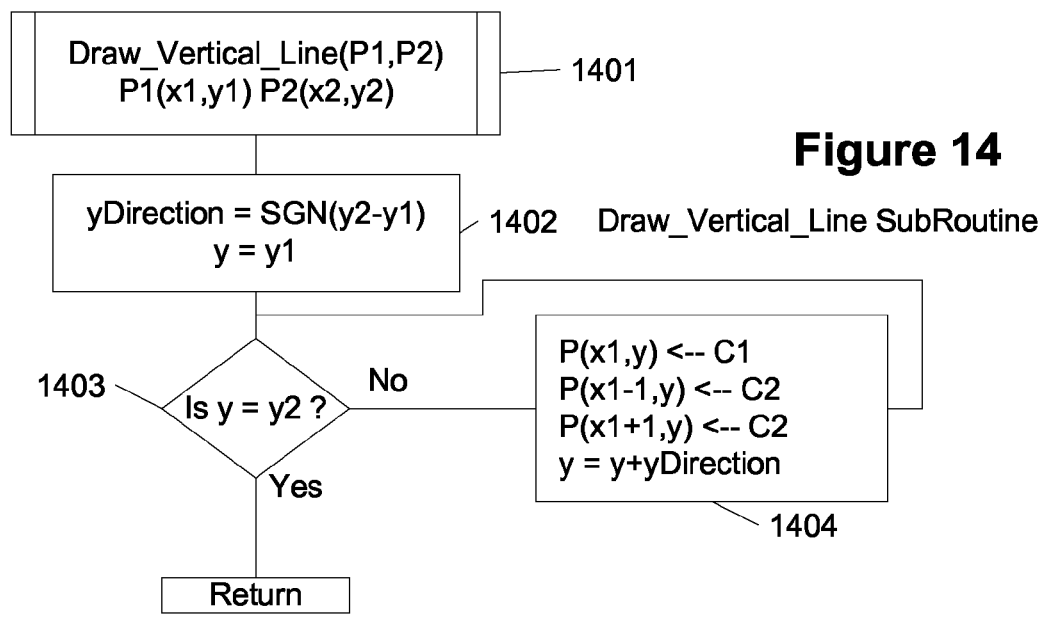
Figure 14  Draw_Vertical_Line SubRoutine
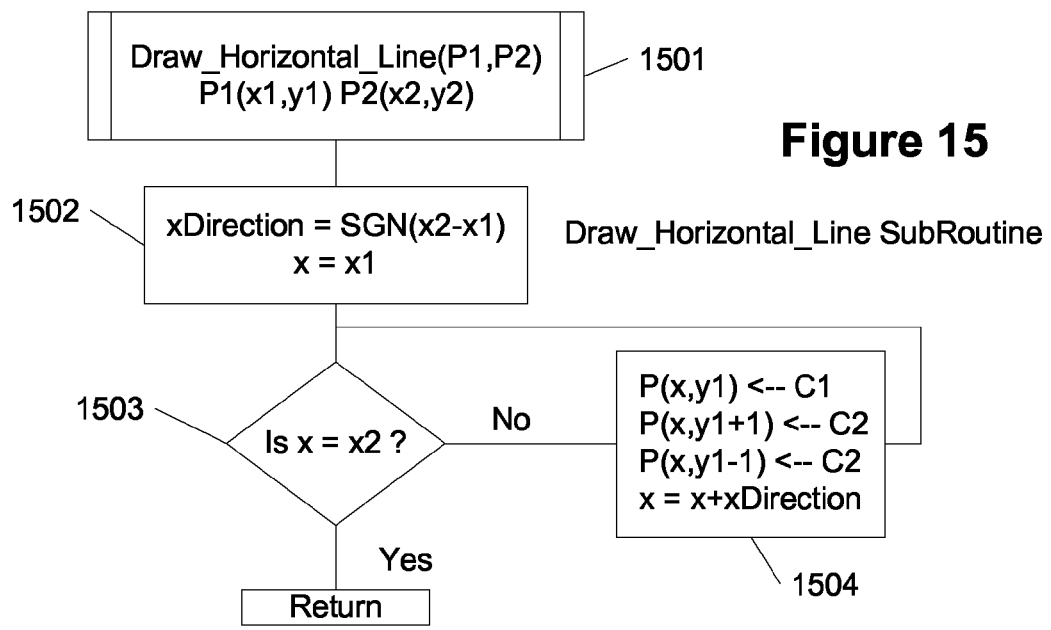
Figure 15  Draw_Horizontal_Line SubRoutine Draw_Diagonal_Line SubRoutine Draw_Line_In_X_Direction SubRoutine Draw_Line_In_Y_Direction SubRoutine

INK THICKNESS RENDERING FOR ELECTRONIC ANNOTATIONS

CROSS REFERENCE TO RELATED APPLICATION

This application is a continuation of prior U.S. application Ser. No. 09/605,878, filed Jun. 29, 2000, the entire contents of which are incorporated herein by reference.

BACKGROUND

1. Technical Field

The disclosure generally relates to the electronic display of documents. More particularly, the disclosure relates to the rendering of the thickness of annotations in electronically displayed documents.

2. Related Art

Many factors today drive the development of computers and computer software. One of these factors is the desire to provide accessibility to information virtually anytime and anywhere. The proliferation of notebook computers, personal digital assistants (PDAs), and other personal electronic devices reflect the fact that users want to be able to access information wherever they may be, whenever they want. In order to facilitate greater levels of information accessibility, the presentation of information must be made as familiar and comfortable as possible.

In this vein, one way to foster success of electronic presentations of information will be to allow users to handle information in a familiar manner. Stated another way, the use and manipulation of electronically-presented information may mimic those paradigms that users are most familiar with, e.g., printed documents, as an initial invitation to their use. As a result, greater familiarity between users and their "machines" will be engendered, thereby fostering greater accessibility, even if the machines have greater capabilities and provide more content to the user beyond the user's expectations. Once users feel comfortable with new electronic presentations, they will be more likely to take advantage of an entire spectrum of available functionality.

One manner of encouraging familiarity is to present information in an electronic book format in which a computer displays information in a manner that closely resembles printed books. In order to more completely mimic a printed book, users will need to have the ability to make textual notes to themselves, akin to writing in the margins of paper books. Users will also want to highlight selected portions, as these are active-reading activities of which a user would expect to see in an electronic book. Users will want to add drawings, arrows, underlining, strike-throughs, and the like, also akin to writing in paper books. Finally, users will want to add bookmarks.

The above-identified so-called "active-reading" activities are available. However, all of these active-reading activities require modification of the underlying document. For example, as is known in the art, if one adds a comment or annotation in an electronic editor, the comment or annotation is inserted into the document. This insertion corrupts the underlying document from its pre-insertion, pristine state. While this may not be an issue in an editable document, the modification of a copyrighted document may run afoul of various copyright provisions. The violations may be compounded with the forwarding of the document to another in its modified state. Further, irrespective of any copyright transgressions, publishing houses responsible for the distribution of the underlying text may not be pleased with any ability to modify their distributed and copyrighted works.

Thus, the users' desire to actively read and annotate works clashes with the goals of publishing houses to keep copyrighted works in their unmodified state. Without solution of this dilemma, the growth of the electronic publishing industry may be hampered, on one hand, by readers who refuse to purchase electronic books because of the inability to annotate read-only documents and, on the other hand, by the publishing industry that refuses to publish titles that allow for annotations that destroy the pristine compilation of the electronic works.

Further, user's who are able to add hand written annotations or drawings (also referred to herein as "ink annotations") need to be able to see the annotations without difficulty. In order for ink annotations to "look good" and provide users with good, useful, functionality (especially for making notes and the like), the rendered ink line-widths need to be smooth looking, not too thin, and not too thick. Existing algorithms for improving line-smoothness tend to trade off between complexity and quality (the simpler methods do not produce lines that look as good while the more complex methods have implementation and execution-speed overhead for producing better quality lines). What is needed is a relatively simple method for rendering smooth looking lines that imposes a small load on processing resources.

SUMMARY

The present invention provides a technique for annotating an electronic document without corruption of the document itself. In the context of the present invention, a "document" encompasses all forms of electronically displayable information including but not limited to books, manuals, reference materials, picture books, etc. To create an annotation, a user selects an object in the document to locate where the annotation is to be placed. The computer system determines which object has been selected and determines a file position associated with the selected object. The user adds the annotation and, eventually, returns to reading the document. The annotations may be filtered, navigated, sorted, and indexed per user input. Annotations may include text annotations, drawings, highlights, bookmarks, and the like as is related to the general field of active reading.

In the context of the present invention, a displayed "object" may include text, graphics, equations, and other related elements as contained in the displayed document. Annotations may include highlighting, adding textual notes, adding drawings (as one would expect to do with a pencil or pen to a paper book), and adding bookmarks.

To associate an annotation with a selected object, the annotations are linked to a file position in the non-modifiable document. The invention calculates the file position of, for example, the first character of the word (or other displayed element) and stores the file position with the annotation in a separate, linked local file. Alternatively, the non-modifiable document may represent a non-modifiable portion of a file, with the annotations being added to a write-enabled portion of the file.

The determined file position may be used for direct random access into the non-modifiable document despite the document being compressed or decompressed. In one embodiment, the file position is specified in a UTF-8 (a known textual storage format) document derived from an original Unicode (another known textual storage format). However, in order to conserve space, the non-modifiable document may be compressed using a general-purpose binary compression algorithm, decompressed, and translated to Unicode for viewing. Accordingly, the file position as stored for an annotation is consistent through various storage schemes and compression techniques.

This invention further relates to adjusting the thickness of rendered lines for ink annotations. Ink annotations are created by capturing and connecting a set of data points input by a user. Various systems exist for rendering the ink annotation by connecting the data points into lines or curves. Anti-aliasing techniques may then be applied. While known techniques provide lines connecting the points, the lines may be too thin or too thick as actually rendered. The invention includes a number of related concepts including:

1. adding outlines to lines with the outline pixels being a merger of the line color and the background color (white, for example) (in the situations where the background is darker than the line color, the outline pixels are rendered as a combination of the light line color and the darker background);
2. anti-aliasing based on where an ideal line would pass through a pair of pixels and weighting the amount of color applied to each of the two pixels based on the percentage of the line occupying that pixel;
3. modifying the outline technique of no. 1 above when encountering anti-aliasing of no. 2 above to add only one extra pixel juxtaposed to the darker of the two anti-aliased pixels, except when both anti-aliased pixels have equal color, in which case the outline is added juxtaposed to both pixels (in the situation of a darker background and lighter line color, an extra pixel is juxtaposed to the lighter of the two anti-aliased pixels); and,
4. clamping the anti-aliased colors to be no lighter than the outline color (for example, if making an dark green annotation with a light green outline, the invention clamps any intermediate anti-aliased colors to be no lighter than the light green highlight color thus providing a consistently smooth visual affect). (In the situation of a darker background and lighter line color, the invention clamps the anti-aliased color to be no darker than the outline color).

The system and method improves the perceived quality of a rendered ink mark created by a user on a document page. Using the disclosed system and method, ink lines are rendered with a smooth, pleasant appearance, not too thick and not too thin, and can be used for making good quality, legible, ink marks (such as may be needed for handwritten ink notes).

The disclosed system and method creates smooth-looking lines by making the following enhancements to existing line drawing algorithms:

1. For any ink point of a particular color (C1) being drawn on a background of color (C2), determine an intermediate color (C3) that is weighted in favor of the background. (For any 2 colors C1 and C2, C3 would thus be a mixture of C1 and C2 but weighted towards C2—If the background is white or lighter than C1, C3 would then be a lighter version of C1).
2. When drawing a point of Color C1, surround this point with colors C3. The exact points that are painted with C3 depend on the direction of the ink line and the positions of the individual points. For vertical and horizontal lines, additional C3 points are drawn perpendicular to the direction of the line. For diagonals, C3 points are drawn above and below the line.
3. When anti-aliasing lines across edges or discontinuities (using available anti-aliased methods), calculate the anti-aliased pixel colors that approximate a point of color C1 lying somewhere between two physical pixels. For darker lines and lighter backgrounds, replace any color lighter than C3 with C3. For lighter lines and darker backgrounds, replace any color darker than C3 with C3.
4. For anti-aliased pairs of points, in which each of a pair of points has unequal colors, visually balance the pair by adding a third point of Color C3 next to the darker point (for lighter backgrounds) or the lighter point (for darker backgrounds) of the pair on the opposite side from the other point in the pair. If the pair has equal colors, add C3 points on both sides of the pair. Physical location of the points depends on the direction of the line.

The system and method may be combined with U.S. Ser. No. 09/603,781 filed Jun. 26, 2000, entitled "Ink Color Rendering for Electronic Annotations" (incorporated by reference for any essential subject matter) so as to render ink annotations at a proper thickness and as combinations of underlying layers of ink.

These and other novel advantages, details, embodiments, features and objects of the present invention will be apparent to those skilled in the art from following the detailed description of the invention, the attached claims and accompanying drawings, listed herein, which are useful in explaining the invention.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 3A and 3B show different document formats available for storing a document in accordance with embodiments of the present invention.

FIG. 6 shows another process for determining the file position of an object in accordance with embodiments of the present invention.

FIG. 7 shows a process for displaying annotations in accordance with embodiments of the present invention.

FIGS. 8A and 8B show various storage techniques for storing annotations in accordance with embodiments of the present invention.

FIG. 9 shows a screen for manipulating annotations in accordance with embodiments of the present invention.

FIGS. 11A-11E show various representations of ink annotations in accordance with embodiments of the present invention.

FIG. 13 shows a process for rendering endpoints of an annotation in accordance with embodiments of the present invention.

FIG. 14 shows a process for drawing vertical lines of an annotation in accordance with embodiments of the present invention.

FIG. 15 shows a process for drawing horizontal lines of an annotation in accordance with embodiments of the present invention.

DETAILED DESCRIPTION

The present invention relates to a system and method for rendering capturing and associating annotations associated with a non-modifiable document.

Although not required, the invention will be described in the general context of computer-executable instructions, such as program modules. Generally, program modules include routines, programs, objects, scripts, components, data structures, etc. that perform particular tasks or implement particular abstract data types. Moreover, those skilled in the art will appreciate that the invention may be practiced with any number of computer system configurations including, but not limited to, distributed computing environments where tasks are performed by remote processing devices that are linked through a communications network. In a distributed computing environment, program modules may be located in both local and remote memory storage devices. The present invention may also be practiced in personal computers (PCs), handheld devices, multiprocessor systems, microprocessor-based or programmable consumer electronics, network PCs, minicomputers, mainframe computers, and the like.

Figure 1:
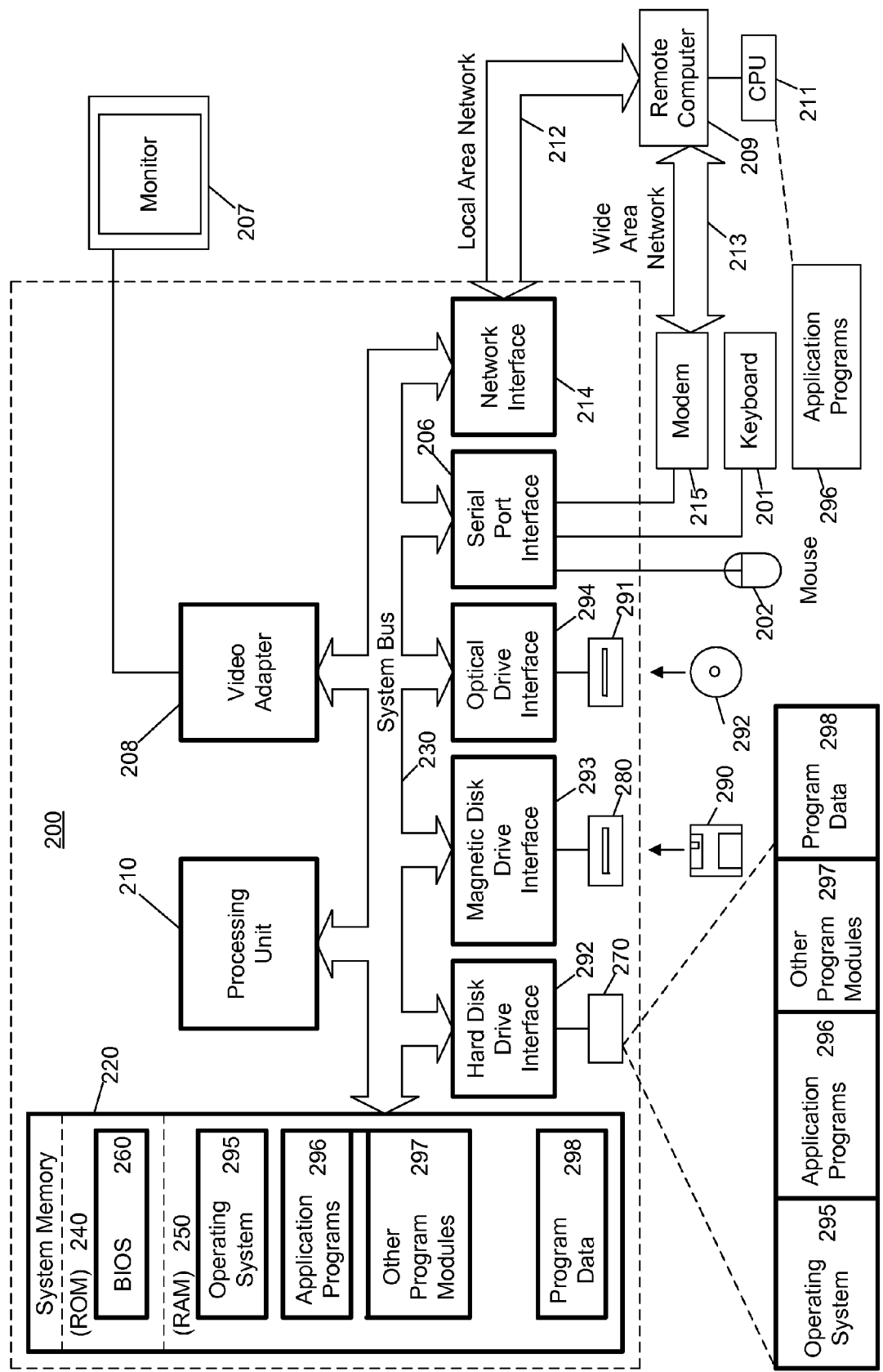
FIG. 1 shows a general-purpose computer supporting the display and annotation of an electronic document in accordance with embodiments of the present invention.

FIG. 1 is a schematic diagram of a computing environment in which the present invention may be implemented. The present invention may be implemented within a general purpose computing device in the form of a conventional personal computer 200, including a processing unit 210, a system memory 220, and a system bus 230 that couples various system components including the system memory to the processing unit 210. The system bus 230 may be any of several types of bus structures including a memory bus or memory controller, a peripheral bus, and a local bus using any of a variety of bus architectures. The system memory includes read only memory (ROM) 240 and random access memory (RAM) 250.

A basic input/output system 260 (BIOS), containing the basic routines that help to transfer information between elements within the personal computer 200, such as during start-up, is stored in ROM 240. The personal computer 200 further includes a hard disk drive 270 for reading from and writing to a hard disk, not shown, a magnetic disk drive 280 for reading from or writing to a removable magnetic disk 290, and an optical disk drive 291 for reading from or writing to a removable optical disk 292 such as a CD ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. The drives and their associated computer-readable media provide nonvolatile storage of computer readable instructions, data structures, program modules and other data for the personal computer 200.

Although the exemplary environment described herein employs a hard disk, a removable magnetic disk 290 and a removable optical disk 292, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 290, optical disk 292, ROM 240 or RAM 250, including an operating system 295, one or more application programs 296, other program modules 297, and program data 298. A user may enter commands and information into the personal computer 200 through input devices such as a keyboard 201 and pointing device 202. Other input devices (not shown) may include a microphone, joystick, game pad, satellite dish, scanner, or the like. These and other input devices are often connected to the processing unit 210 through a serial port interface 206 that is coupled to the system bus, but may be connected by other interfaces, such as a parallel port, game port or a universal serial bus (USB). A monitor 207 or other type of display device is also connected to the system bus 230 via an interface, such as a video adapter 208. In addition to the monitor, personal computers typically include other peripheral output devices (not shown), such as speakers and printers.

The personal computer 200 may operate in a networked environment using logical connections to one or more remote computers, such as a remote computer 209. The remote computer 209 may be another personal computer, a server, a router, a network PC, a peer device or other common network node, and typically includes many or all of the elements described above relative to the personal computer 200, although only a memory storage device 211 has been illustrated in FIG. 1. The logical connections depicted in FIG. 1 include a local area network (LAN) 212 and a wide area network (WAN) 213. Such networking environments are commonplace in offices, enterprise-wide computer networks, intranets and the Internet.

When used in a LAN networking environment, the personal computer 200 is connected to the local network 212 through a network interface or adapter 214. When used in a WAN networking environment, the personal computer 200 typically includes a modem 215 or other means for establishing a communications over the wide area network 213, such as the Internet. The modem 215, which may be internal or external, is connected to the system bus 230 via the serial port interface 206. In a networked environment, program modules depicted relative to the personal computer 200, or portions thereof, may be stored in the remote memory storage device. It will be appreciated that the network connections shown are exemplary and other means of establishing a communications link between the computers may be used.

In addition to the system described in relation to FIG. 1, the invention may be practiced on a handheld computer. Further, purpose-built devices may support the invention as well. In short, handheld computers and purpose-built devices are similar in structure to the system of FIG. 1 but may be limited to a display (which may be touch-sensitive to a human finger or stylus), memory (including RAM and ROM), and a synchronization/modem port for connecting the handheld computer and purpose-built devices to another computer or a network (including the Internet) to download and/or upload documents or download and/or upload annotations. The description of handheld computers and purpose-built devices is known in the art and is omitted for simplicity. The invention may be practiced using C. Also, it is appreciated that other languages may be used including C++, assembly language, and the like.

Figure 2:
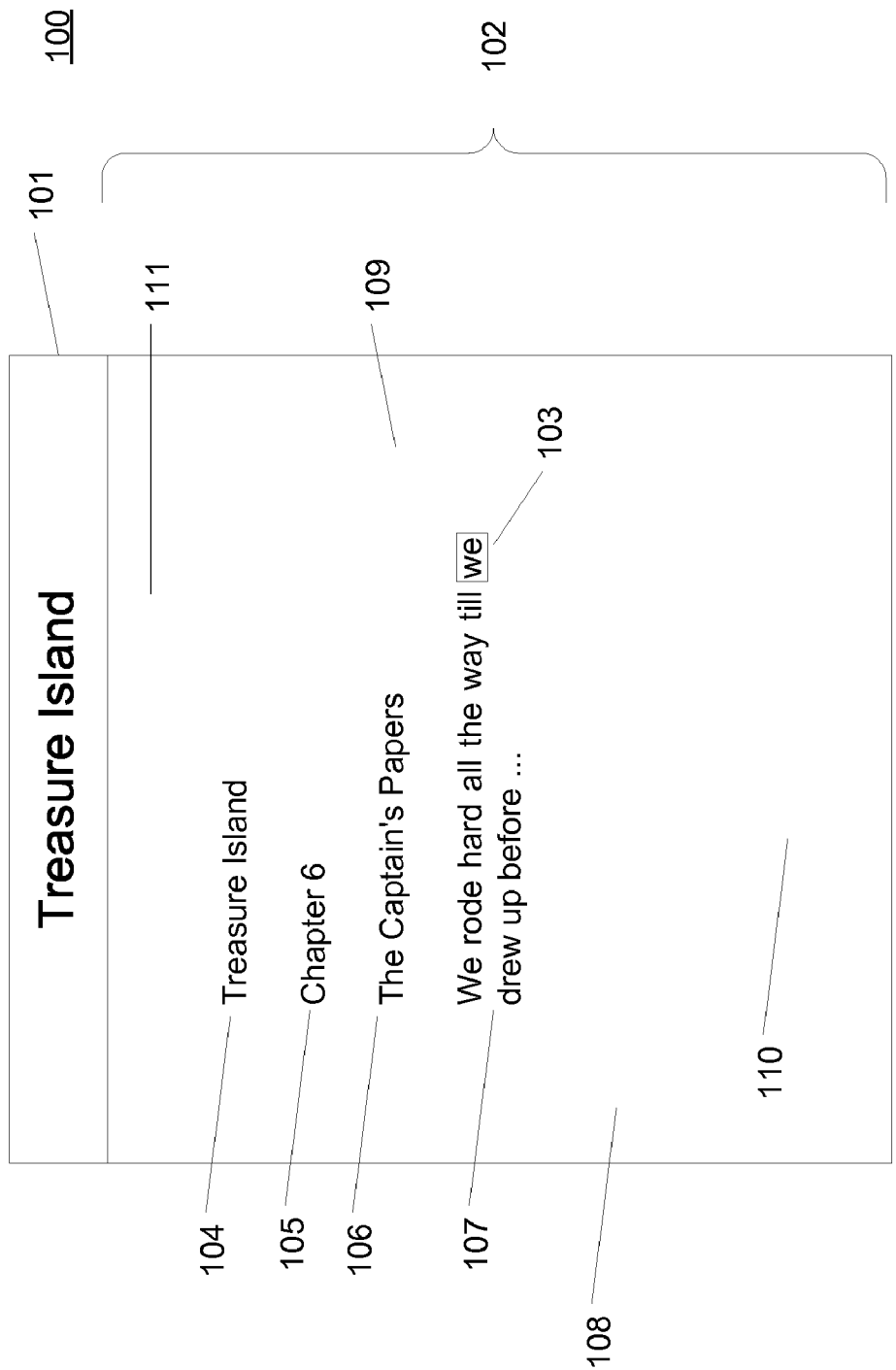
FIG. 2 shows a displayed document on a computer screen in accordance with embodiments of the present invention.

FIG. 2 shows a displayed document on a computer screen in accordance with embodiments of the present invention. As preferred, the document is displayed in a form that closely resembles the appearance of a paper equivalent of the electronic book and, in this case, a paper novel. The document reader window 101 may comprise a variety of portions including a title bar 101 listing the title of the document and a body 102. In the body 102 of the display window, various portions of a document may be displayed. FIG. 2 shows an example where a title 104, a chapter number 105, a chapter title 106, and the text of the chapter 107 are displayed. Similar to an actual book, margins 108, 109, 110, and 111 appear around the displayed text. As referred to herein, the displayed elements may be independently referenced. Here for example, object 103 "we" has a drawing annotation placing a box around it as placed there by the user.

Various schemes exist with which to store electronically displayable information as shown in FIGS. 3A and 3B. With respect to the storage of text, the industry standard is Unicode UCS-2. Unicode UCS-2 encodes text using two bytes per character. The letters from the standard English alphabet to complex symbols including foreign letters and symbols are all encoded using two bytes. FIG. 3A shows a pictorial representation of a four-letter word as stored in four pairs of bytes. Another storage scheme includes UTF-8 in which standard letters (for example, US-ASCII characters) are encoded using only a single byte. Foreign characters and symbols from the Unicode UCS-2 set are encoded with two or three bytes. Part of the first byte is used to indicate how many total bytes define the complete character as shown in FIG. 3B. The remaining bytes are restricted to numeric values that cannot be confused with those used to define a single-byte character. For large texts using standard letters, a UTF8-encoded file may have a size half of that as Unicode. However, in the situation in which a number of foreign characters or symbols, the size of the stored file may actually be larger than that of Unicode due to the greater number of three byte representations of a letter or symbol. Other variable byte-length character encodings have been used in industry, for example, the Shift-JIS standard encodes characters (drawn from a smaller set than Unicode draws from) in one or two bytes. Unlike in UTF-8, the second byte of a two-byte character may contain a value that may also be used by itself to represent a single-byte character.

Figure 4:
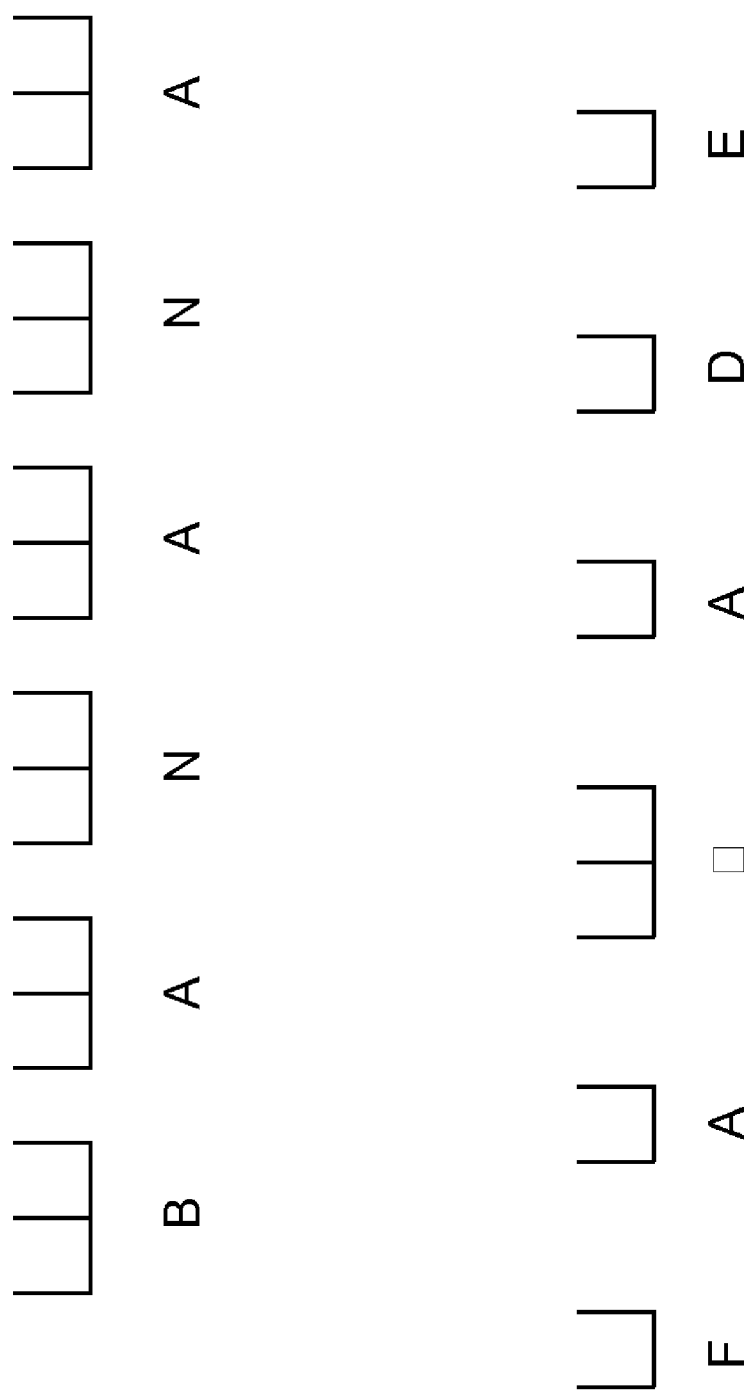
FIG. 4 shows different bytes for storing characters in UTF8 and Unicode in accordance with embodiments of the present invention.

FIG. 4 shows different bytes for storing characters in UTF8 and Unicode in accordance with embodiments of the present invention. An example of the two schemes discussed with respect to FIGS. 3A and 3B is shown in FIG. 4. The word "banana" takes twelve bytes to represent it in Unicode while only using six bytes in UTF8. The word "façade" requires twelve bytes in Unicode and seven bytes in UTF8. Other storage schemes are known in the art but not shown here for simplicity. The difference between UTF8 and Unicode is provided by way of example only and not intended to limit the invention to the use of storage scheme over the other.

The difference in the storage modes becomes relevant in the technique used to fix the file position for an annotation. If the file position is determined with one storage scheme, porting the file position to another storage scheme may not result in the same desired file position for an annotation. Thus, all annotations may be fixed to a file position based on the use of a single scheme. Preferably, the scheme used to hold the document while the document is being displayed is the scheme that is used to determine the file position. So, irrespective of whether the document is closed and compressed to another scheme, when reopened in the display scheme, the file position for the annotation remains the same as when created. Unicode may be the scheme used to display the document. Alternatively, UTF8 may be used as well as any other textual encoding or compression scheme to access the document for display.

Figure 5:
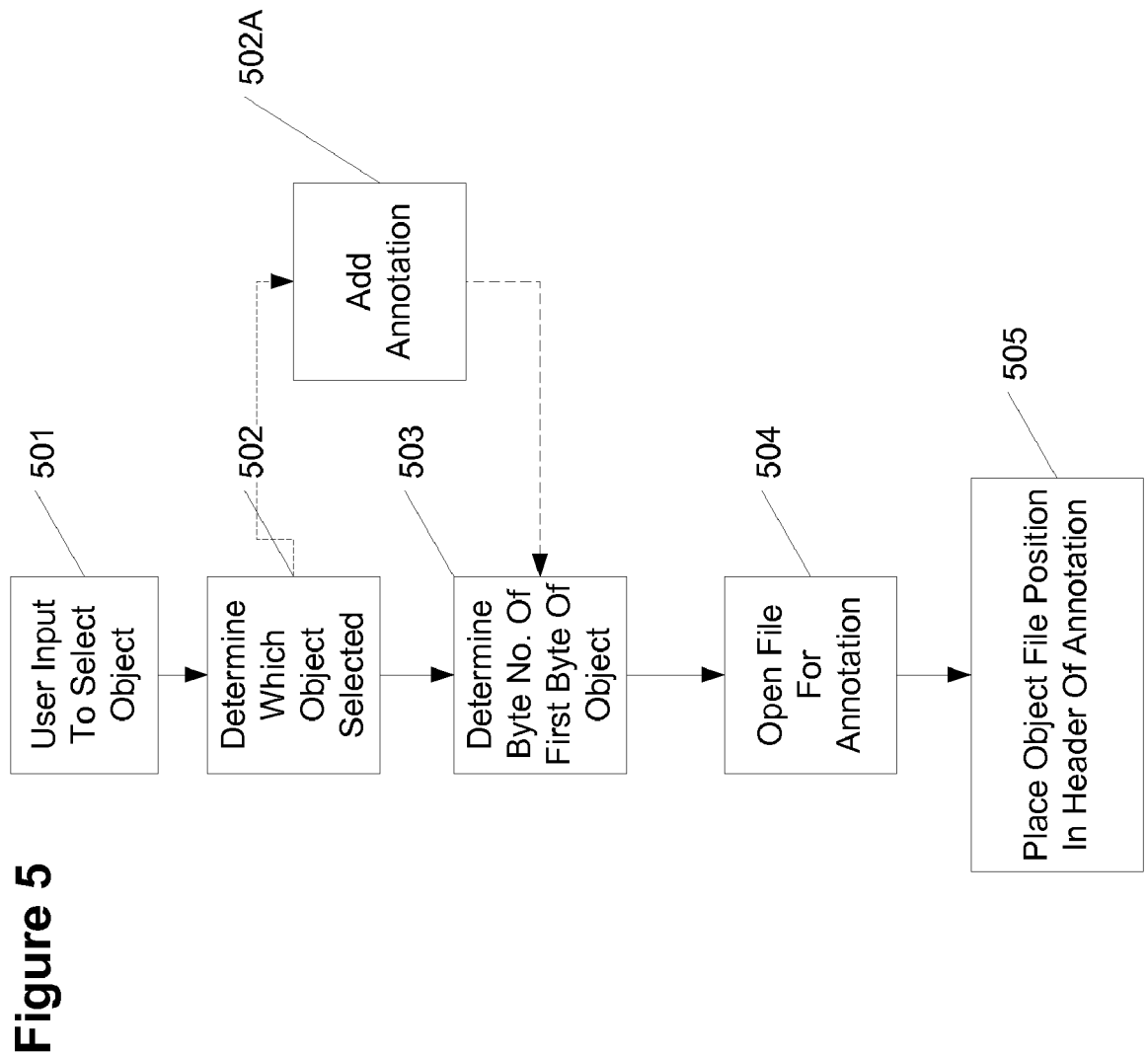
FIG. 5 shows a process for determining the file position of an object in accordance with embodiments of the present invention.

FIG. 5 shows a process for determining the file position of an object in accordance with embodiments of the present invention. In step 501, a user selects an object on the screen. The user may select the object via a cursor controlled through a mouse, touch-pad, trackball, or like pointing device. Alternatively, the user may use a stylus or finger if the surface of the display can accommodate such input.

In step 502, the system determines which object was selected by the user. This step relates to the conversion of the physical coordinates from the display device to coordinates inside the reader window. From this conversion, the object selected by the user is known.

Step 502A is optional. It relates to the user selection of an action post selection of the object. If the user is supplied with a menu after selection of the object and the function of adding an annotation is provided on the menu, step 502A relates to the selection of the adding the annotation function. An example of adding an annotation is described in detail in U.S. Ser. No. 09/455,806, filed Dec. 7, 1999, entitled "Method and Apparatus for Capturing and Rendering Text Annotations For Non-Modifiable Electronic Content" whose contents are incorporated by reference for any essential subject matter.

Step 503 relates to the determination of the file position of the selected object. The file position may include the first byte of the selected object. Alternatively, the file position may be the first byte of the last character (or even the character following the last character) of the selected object. Selecting the first byte of the first character to determine the file position provides the advantage of displaying any annotation on the page of the beginning of the object, rather then on the next page if the object spans a page. Anyone of skill in the art will appreciate that any byte of the selected object (or surrounding the selected object) may be selected to provide the file position of the object. Alternatively, one may select a line in which the object resides or the paragraph or the portion of the page (e.g., the top, middle or bottom of the page).

The file position may be determined by counting the number of bytes from some known file position to the location of, for example, the first character of the selected object. The known file position may be the beginning of the file, or may be, for example, a previously noted file position for the beginning of the current paragraph. The counting step may be performed before or after generation of the annotation. Alternatively, the counting step may be performed in the background while the annotation is being created by the user. Note that annotation file positions may always stored as UTF-8 offsets within the text, as it stood before binary compression. However, the algorithm used to display the text works with Unicode characters. Therefore, in this example, it is necessary to work back from the selected object to a character with a known UTF-8 file position.

Because the binary file-format of the original publication (electronic book, document, etc.) intermixes markup (tags) with text, it is necessary to discount the bytes taken by such tags when calculating the file-position for the selected object (to which the annotation will be anchored). However, of the said tags, many if not most do not take up a character-position on the display surface. Therefore, it is necessary to keep track of the starting file position of every run of text on the display, which corresponds to an unbroken run of text in the file. An "unbroken" run of text refers to text in the file that is not broken by a start- or an end- tag.

Therefore, the steps involved in accurately determining the file position for anchoring the annotation to the selected object are:

Look up in our data structures what display character position is the start of an "unbroken" run described in the preceding paragraphs.
1) Fetch from the same data structure the file-position associated with the starting display-character position.
2) Determine the string which runs from the run-start position to the selection-start position. This string contains some number of Unicode characters.
3) Determine how many UTF-8 bytes would be required to hold a UTF-8-encdoded version of the string from step 3).
4) Add the UTF-8 bytecount from step 4 to the file-position from step 2.

Step 504 relates to creating a file to persist the annotation. While shown after step 503, it will be appreciated that it may occur prior to or during the determination of the file position of the object. In step 505, the file position is placed in the header of the file (or portion of the file) storing the created annotation. Alternatively, the file position may be appended to the file being viewed.

FIG. 6 shows another process for determining the file position of an object in accordance with embodiments of the present invention. As shown in step 601, a user navigates to a page. Once on the page, the system determines the file position of the first byte of the first object on the page as shown in step 602. The file position may be determined every time a new page is displayed. Alternatively, the system may pause (for example, two seconds) before starting to determine the file position for the first byte in order to allow the user to navigate to a new page before starting the file position determination. This delay provides the advantage of minimizing system workload when a user is quickly flipping pages. Once the user settles down with a given page, the system may then determine the file position of the first byte.

In step 603, the file position of the page is temporarily stored in memory.

In step 604, the system waits for either selection of an object or navigation to another page. More options are contemplated that do not need the file position for execution (for example, looking up a term in a reference document as disclosed in U.S. Ser. No. 09/455,754 filed Dec. 7, 1999, entitled "Method and Apparatus for Installing and Using Reference Materials In Conjunction With Reading Electronic Content", whose contents are incorporated herein by reference in its entirety for any enabling disclosure).

In step 605, once an object is selected, the relative position of the selected object is determined with reference to the first byte of the first object on the displayed page.

In step 606, the file position of the first byte of the first object on the page as determined in step 602 is retrieved from memory (as stored in step 603) and added to the relative position of the first byte of the selected object as determined in step 605 to determine the file position of the selected object.

In step 607, the file position of the selected object is stored along with the created annotation. These steps relating to the determination of the file position may occur before or after the annotation for the object. Alternatively, the file position may be preformed in the background while the annotation is being created. Those skilled in the art will appreciate that any number of techniques may be used to determine object position and still be considered to be within the scope of the present invention.

FIG. 7 relates to a process for displaying the created annotation when navigating to the page. In step 701, a user navigates to a page.

In step 702, the system determines the file position of the first object on the page.

In step 703, the system determines the file position of the last object on the page.

In step 704, the annotations stored for the document are searched to determine if any have file positions located between the file position determined in step 702 and the file position determined in step 703.

In step 705, if no annotations with a file position are located for display on the displayed page, the system waits for user input (including, for example, navigation to a new page or selection of an object for annotation, or any other action described herein).

In step 706, an annotation has been found that relates to an object on the page. The location of the object on the page is determined and the annotation is displayed for the object. The system for determining the location of the object may include subtracting the file position of the first object on the page from the file position of the annotated object. This difference is then used to determine how many bytes from the first character of the page is the annotated object. At this point, further annotations may be made, by returning from step 706 to step 705.

Alternatively, the system may count again from the beginning of the document to determine which object has been annotated. It will be appreciated by those skilled in the art that that numerous methods exist for displaying the annotation for the annotated object. The above examples are not intended to be limiting.

In the context of displaying the annotations that are determined to exist in a given "page" of the content (the unit of text being viewed by the user at any given time), the computer system will first validate a global state, which determines whether annotations should be rendered at all. For example, the user is provided with the ability to globally specify whether to show or hide drawing annotations (as well as text notes, bookmarks, highlights, etc.). Prior to displaying a particular annotation of an object, the computer system will check this global setting to determine whether or not to render the specific annotation. If the user has chosen to hide annotations of that particular type, the annotation will not be rendered.

FIGS. 8A and 8B show various storage techniques for storing annotations in accordance with embodiments of the present invention. FIG. 8A shows a document 801 that has modifiable (803-806) and non-modifiable (802) portions. Files of this type include Infotext file formats as are known in the art. Annotations 806 may be stored in combination with the non-modifiable content 802. An annotation 806 may be stored in a file with header 803 and body 806. The header 803 includes, for example, the file position 804 of the object with which the annotation 806 is associated. It may also include an indication of the type of annotation 806 in file portion 805. As discussed above, the annotation 806 may include a highlight, a bookmark, a drawing to be overlaid over the object, or a text annotation.

FIG. 8B shows the non-modifiable content 809 as a separate file apart from the annotation file. The annotation file 807 of FIG. 8B has similar constituent elements to that of annotation 807 of FIG. 8A. Annotation file 807 may include a file portion 808 that indicates to which non-modifiable document (here, 809) it is linked. Using the approach set forth in FIG. 8B, one file may store all annotations for a user with the non-modifiable content portions 809 being stored separately. This approach has the advantage of being able to quickly scan all annotations at one time rather than accessing all documents 801 (as including non-modifiable portions 802) to obtain all annotations stored therein.

FIG. 9 shows a display window for sorting, modifying, searching, and renaming the annotations stored in a system. The window 900 includes a title identifier 901 to alert the user that he or she is in an annotation pane 900. The window 900 may include two panes 902 and 903 (other panes may be added as needed). Panes 902 and 903 may provide a listing of annotations 904 by document. Alternatively, they may provide a listing of all annotations in a person's system. When in pane 902 (here, entitled "Notes"), the user may sort the list of annotations by type (highlight, drawing, text, bookmark). Selecting an annotation allows one to navigate to the location in the document containing the annotation. Selecting and holding the annotation allows one to remove, change the appearance of, hide or show that particular annotation, or rename the annotation. The second pane 903 (here, entitled "View") may allow a user to sort annotations based on their properties. For example, one may sort on the time created, time last accessed, by type, alphabetically, and on book order. Further, individual annotations may be switched on or off using controls on the page. Also, if all annotations have been switched off (or just those of a specific type of annotations have been switched off) and another annotation is created (or another annotation in that class), all annotations of that type may be switched back on. This may be extended to include all annotations being switched on if hidden and a new annotation added.

Figure 10:
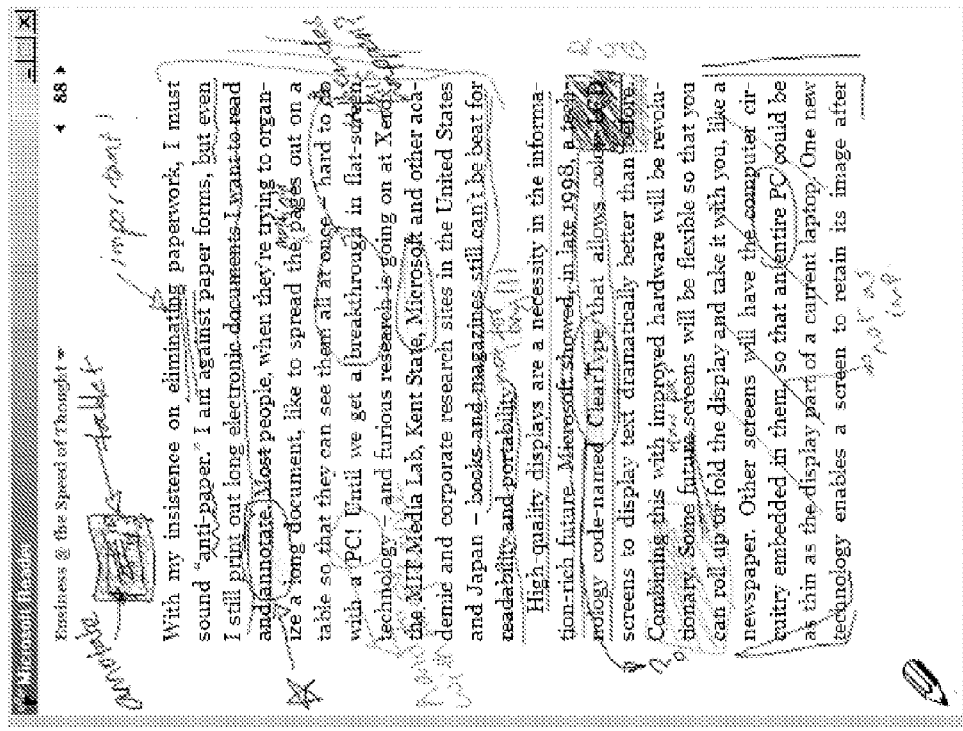
FIG. 10 shows before and after images of annotations on a page in accordance with embodiments of the present invention.

FIG. 10 shows a representative example 1001 of an ink-annotated document after application of this invention in accordance with embodiments of the invention.

FIG. 11 shows five displays of information relating to ink annotations. FIG. 11A shows mouse points that are captured based on the user's input. The input may be a stylus or finger on a touch screen, a mouse, a joystick, and the like. FIG. 11B shows the above points rendered as single-pixel wide lines using the Windows® operating system Polyline API. The lines seem scratchy and thin and make viewing difficult for users using high resolution devices with little contrast between the background color and the line color. FIG. 11C shows 2-pixel wide lines using the Windows® operating system Polyline API. The lines appear chunky and big. The thickness of the lines hide details present in the annotations due to the width of the lines. When capturing handwriting, these thicker lines make reading small handwritten annotations difficult. FIG. 11D shows a simple anti-aliased rendition using two known algorithms—Bertelsmann's line drawing algorithm and Wu's anti-aliasing algorithm. The lines appear smoother compared to FIG. 11B, but still look thin and uneven. Finally, FIG. 11E shows lines drawn with the system and method as disclosed herein. The use of the invention improves the apparent thickness of the line as well as the perceived smoothness of the line so as to provide better looking ink annotations.

Figure 12:
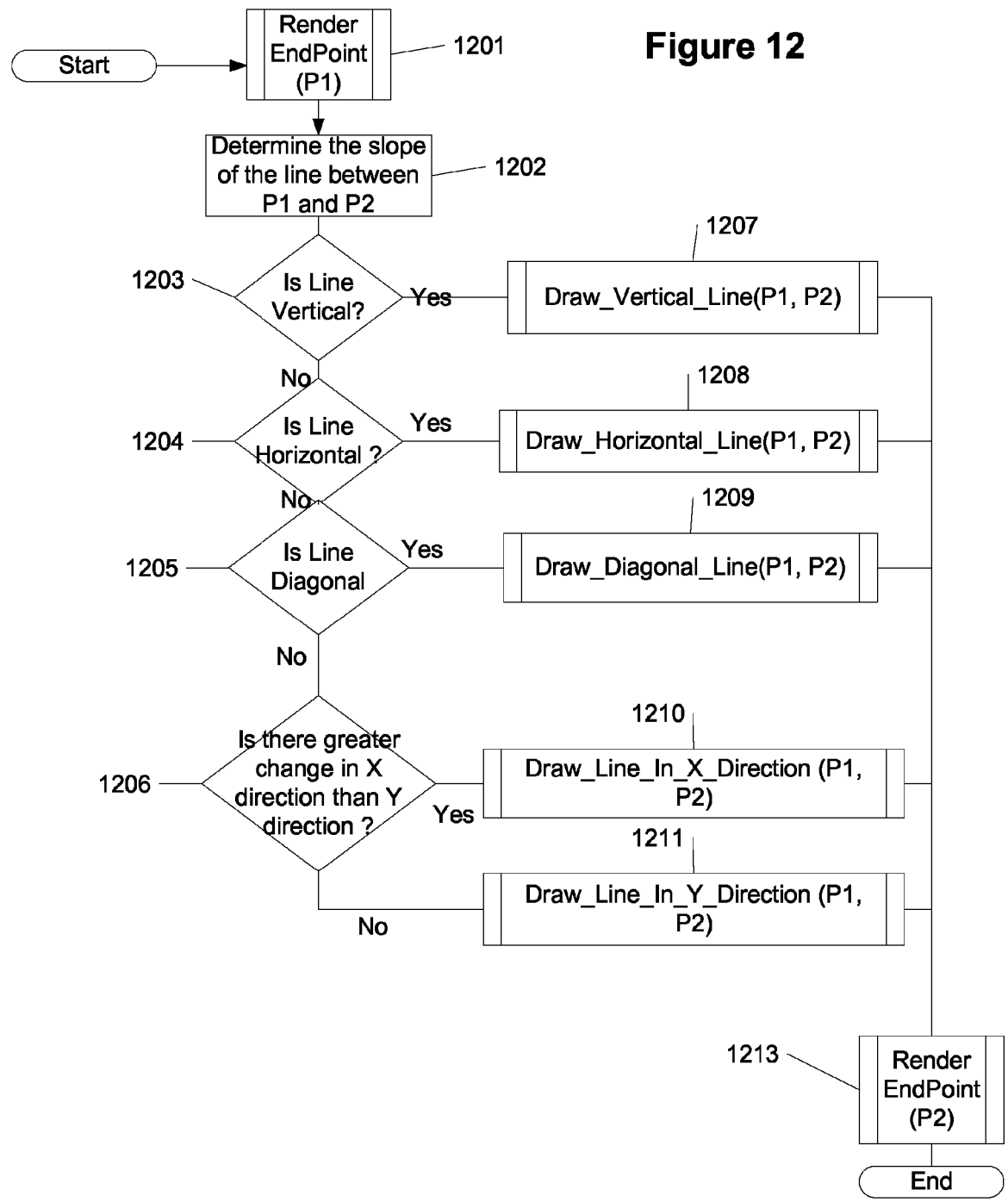
FIG. 12 shows a process for rendering an annotation in accordance with embodiments of the present invention.

FIG. 12 shows a process for rendering an annotation having end points P1, P2. The following provides a list of terms used therein:

C1=Ink (or Pen) Color
B=Color of Background
w=Weighing Factor used for determining Outline color. w can be varied to obtain maximum visual effect.
C2=Outline Color=(C1+w*B)/(w+1)
C3, C4=anti-aliased colors at discontinued points The process of FIG. 12 is directed for use with a background color B being lighter than C1. Based on the disclosure, it is considered within the level of skill of one to modify the process to handle background colors that are darker than the line color.

For colors expressed as RGB values (Red,Green,Blue), mathematical operations between colors are performed on the individual R, G, and B values (e.g. C1 (R1,G1,B1)<C2(R2, G2,B2) means R1<R2 and G1<G2 and B1<B2).

The Notation "P(x,y)<—C" denotes that the color of pixel (or point) P having on-screen coordinates x and y is being set to the Color C.

Referring to FIG. 12, the Figure describes the process of rendering a line between any two points Pl(x1, y1) and P2(x2, y2). In step 1201, the system renders point P1 (an end point of an annotation). In step 1202, the system determines the slope of the line between points P1 and P2. In step 1203, the system determines whether the line is vertical. If so, the system draws a vertical line in step 1207. In step 1204, the system determines whether the line is horizontal. If so, the system draws a horizontal line in 1208. In step 1205, the system determines whether the line is diagonal. If so, the system draws a diagonal line in step 1209. In step 1206, the system determines whether the line is has a greater change in the X direction than the Y direction (if the line is flatter than steeper). If so, the system draws a line in the X direction (step 1210). Otherwise (meaning that the line is steeper than it is flatter), the system draws a line in the Y direction (step 1211). Finally, after drawing the line from P1 to P2, the system renders end point P2 (step 1213) and ends.

FIG. 13 shows the end point rendering steps of steps 1201 and 1213. The point P(x,y) as passed to the subroutine (step 1301) is rendered in step 1302 as color C1 (the pen or ink color). Along with rendering point P(x,y), the system renders four points around point P(x,y) in color C2 (the outline color). The four points are P(x−1,y), P(x+1,y), P(x,y−1), and P(x,y+1). The outline color is a combination of the ink color C1 and the background color and may be expressed as (C1+w*B)/(w+1). An initial weighting value of w may be set to 4. This provides a weighting value of how light the outline color is to appear (in this example, on a light background). A larger w means a lighter outline color C2. So, for the red, green, and blue outline colors may be expressed as:

$$r2=(r1+w*r\text{back})/(w+1)$$

$$g2=(g1+w*g\text{back})/(w+1)$$

$$b2=(b1+w*b\text{back})/(w+1)$$

With r2 being the red component of C2, g2 being the green component of C2, b2 being the blue component of C2, r1 being the red component of C1, g1 being the green component of C1, and b1 being the blue component of C1, and rback being the red component of B, gback being the green component of B, and bback being the blue component of B.

Finally, in step 1303, the system returns back to the process of FIG. 12.

FIG. 14 shows the vertical line drawing step (step 1207) from FIG. 12. In step 1401, the process receives the parameters of point P1 and P2 as P1(x1,y1) and P2(x2,y2). In step 1402, the process determines the direction of the y component of the line from P1 to P2. In steps 1403 and 1404, the system draws a vertical line comprising point P(x1,y) being set to C1 and incrementing (or decrementing) y until y=y2. Also in step 1404, points on either side of P(x1,y) are rendered as well in C2 (here, P(x1−1,y) and P(x1+1,y)). Finally, the subroutine returns to the process of FIG. 12. As shown in the Figure, function SGN(z) is used and returns the "sign" of the term "z" (e.g., SGN(4)=+1, SGN(−5)=−1).

FIG. 15 shows the horizontal line drawing step (step 1208) from FIG. 12. In step 1501, the process receives the parameters of point P1 and P2 as P1(x1,y1) and P2(x2,y2). In step 1502, the process determines the direction of the y component of the line from P1 to P2. In steps 1503 and 1504, the system draws a horizontal line comprising point P(x,y1) being set to C1 and incrementing (or decrementing) x until x=x2. Also in step 1504, points on either side of P(x,y1) are rendered in C2 (here, P(x,y1−1) and P(x,y1+1)). Finally, the subroutine returns to the process of FIG. 12.

Figure 16:
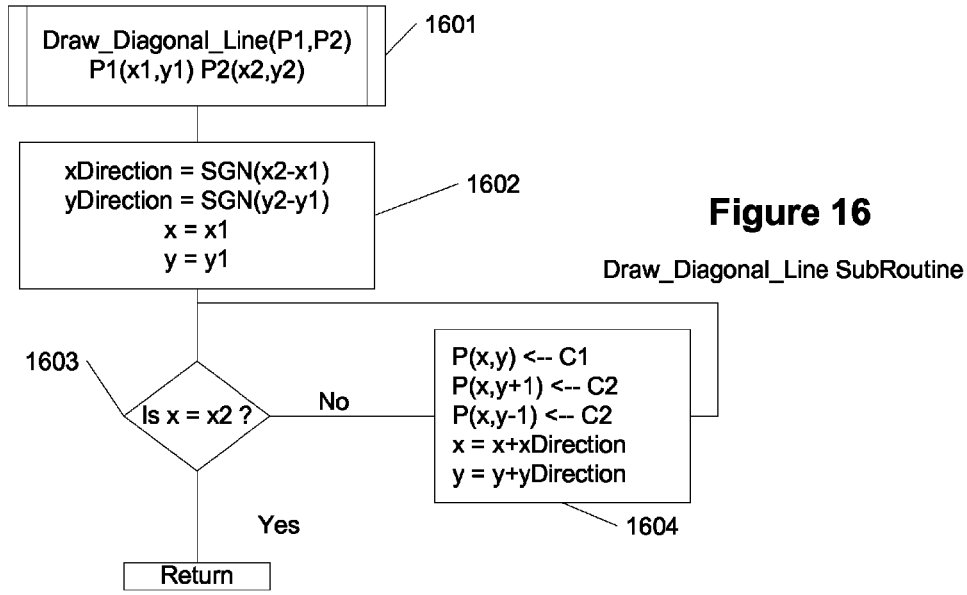
FIG. 16 shows a process for drawing diagonal lines of an annotation in accordance with embodiments of the present invention.

FIG. 16 shows the draw diagonal line subroutine of step 1209. The subroutine receives the end points P1(x1,y1) and P2(x2,y2) in step 1601. The process determines (step 1602) the direction of the line from P1 to P2 and starts at P1(x1,y1). In steps 1603 and 1604, the process draws a diagonal line comprising point P(x,y) being set to C1 and incrementing (or decrementing) x until x=x2 and y until y=y2. Also in step 1604, points above and below of P(x,y) are rendered in C2 (here, P(x,y−1) and P(x,y+1)). Finally, the subroutine returns to the process of FIG. 12.

Figure 17:
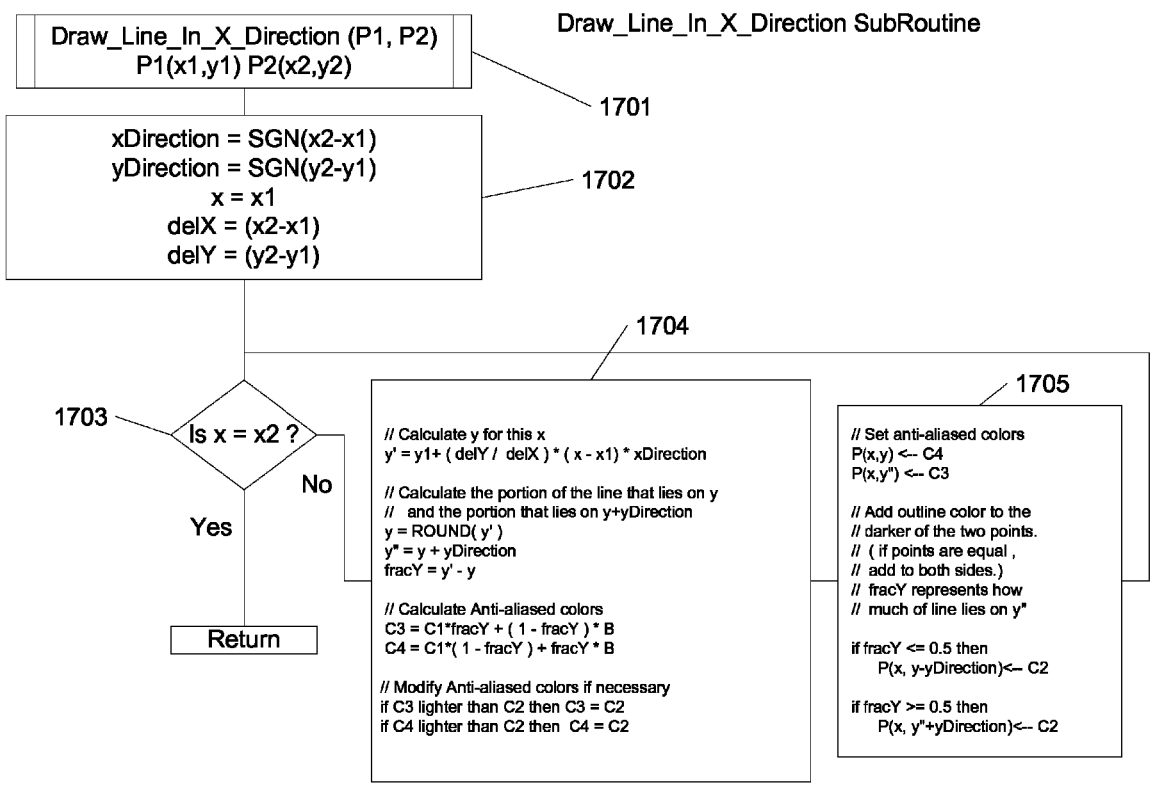
FIGS. 17 and 18 show processes for drawing sloped lines of an annotation in accordance with embodiments of the present invention.

FIG. 17 shows the subroutine of step 1210 of FIG. 12. In step 1701, the subroutine receives the points (P1, P2). In step 1702, the process determines the direction of the line from P1 to P2 and starts at P1. Further, the process determines the change in X and the change in Y (referred to as delX and delY). In steps 1703, 1704 and 1705, the process renders a line in the X direction. In step 1704, the system determines the portion of the line that lies on y and the next y (y+yDirection). The process next determines the anti-aliased colors C3, C4 based on the portion of the line lying in one pixel as compared to another. Finally, the system checks to see if the anti-aliased colors are lighter than the outline color C2. If anti-aliased color is lighter than C2, it is clamped to C2. As shown in FIG. 17, the process uses a ROUND( ) function. For purposes herein, the function ROUND(z) rounds down the number "z" (e.g. ROUND(4.3)=4, ROUND(6.99)=6).

It is noted that, when light ink and a dark background are used and when using a dark outline color (C2), the process determines if the anti-aliased color is darker than the outline color and sets the anti-aliased color to the outline color C2.

In step 1705, the process sets the two anti-aliased pixels to the colors C3, C4. Finally, the process determines which of the two anti-aliased pixels has more of the line and adds an outline point to the other side of it. The ratio of the amount of line lying on one of the anti-aliased pixels is fracY. If the points are equal, an outline point is added to both sides of the pair of anti-alised pixels. The set of processes 1703-1705 steps through all x points until it arrives at P2 at which point the system returns to FIG. 12.

Figure 18:
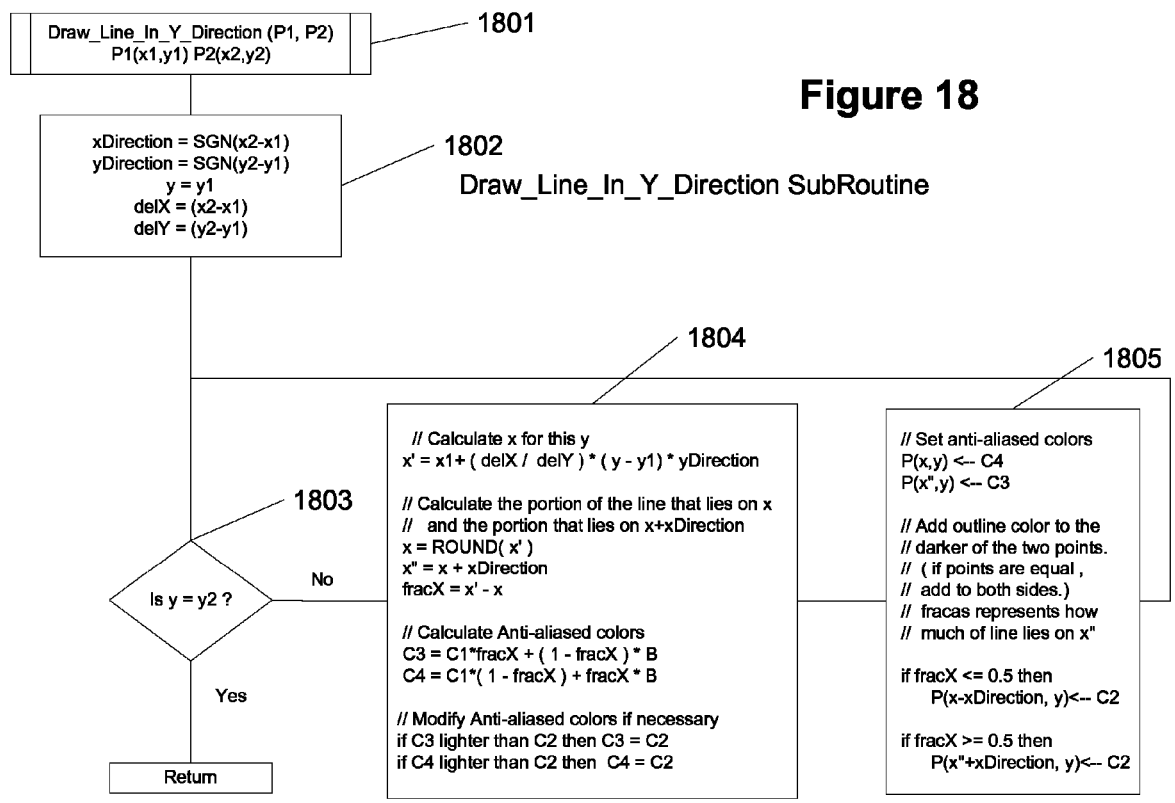

FIG. 18 shows the subroutine of step 1210 of FIG. 12. In step 1801, the subroutine receives the points (P1, P2). In step 1802, the process determines the direction of the line from P1 to P2 and starts at P1. Further, the process determines the change in X and the change in Y (referred to as delX and delY). In steps 1803, 1804 and 1805, the process renders a line in the Y direction. In step 1804, the system determines the portion of the line that lies on x and the next x (x+xDirection). The process next determines the anti-aliased colors C3, C4 based on the portion of the line lying in one anti-aliased pixel as compared to the other. Finally, the system checks to see if the anti-aliased colors are lighter than the outline color C2. If anti-aliased color is lighter than C2, it is clamped to C2.

It is noted that, when light ink and a dark background are used and when using a dark outline color (C2), the process determines if the anti-aliased color is darker than the outline color and sets the anti-aliased color to the outline color C2.

In step 1805, the process sets the two anti-aliased pixels to the colors C3, C4. Finally, the process determines which of the two anti-aliased pixels has more of the line and adds an outline point to the other side of it. The ratio of the amount of line lying on one of the anti-aliased pixels is fracX. If the points are equal, an outline point is added to both sides of the pair of anti-alised pixels. The set of processes 1803-1805 steps through all y points until it arrives at P2 at which point the system returns to FIG. 12.

The system has been described in relation to providing various outline points around lines. Other outlining techniques are possible including only providing outlines on one side of a line or another. Further, an alternative technique includes alternating from one side of a line with outline points to the other. This approach provides a lighter outlining impression. Another alternative includes having an outline varying depth (instead of just +/−1 pixel, but 2, 3, 4 pixels and the like). This approach provides a greater visualization on high resolution monitors. Another approach is to have an outline of varying depth with different intensities at different depths (to create a "fade-out" effect—outline points closer to a dark line would be darker than outline points further away from the same line). This approach provides greater visualization at higher resolutions without sharp outline edges. Yet another approach includes having outlines of varying depth for different parts of the annotation (e.g. determine cases where annotation is clumped (like in handwriting) vs. non-clumped (as in open drawings) and vary outline thickness accordingly. This approach accommodates cleaner yet easily legible lines. Another approach includes varying the outline color dynamically (e.g. vary the color depending on the underlying background on any point). This approach accommodates the use of multiple layers of ink. If combining layers of ink subtractively, the perceived colors of the outlines automatically change with changes in the background (as discussed in U.S. Ser. No. 09/603,781 filed Jun. 26, 2000, entitled "Ink Color Rendering for Electronic Annotations") as incorporated herein by reference. Another approach is to vary the outline thickness as a function of line thickness. This approach makes thin lines more easily to see while not enlarging already easily legible lines. Other outline techniques will become known from a review of the foregoing description.

While the present description has been described in relation to non-modifiable content, it is appreciated that the disclosed system and method are applicable to systems incorporating modifiable content as well.

In the foregoing specification, the present invention has been described with reference to specific exemplary embodiments thereof. Although the invention has been described in terms of various embodiments, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

I claim:

1. A computer-implemented method for annotating a system having a display for displaying a page, said method comprising the steps of:
    receiving an annotation;
    applying one of outline pixels and anti-aliased pixels to at least some pixels surrounding said annotation;
    applying the other one of said outline pixels and said anti-aliased pixels; and
    displaying said annotation with a first displayable thickness and said outline pixels with a second displayable thickness and said anti-aliased pixels with a third displayable thickness on said display, wherein said outline pixels extend beyond said annotation.

2. The computer-implemented method according to claim 1, further comprising the step of:
    applying an anti-aliasing filter so as to create said anti-aliased pixels for said annotation prior to said outline applying step.

3. The computer-implemented method according to claim 2, wherein the outline applying step further comprises the step of:
    adding an outline pixel juxtaposed to one of a pair of anti-aliased pixels, wherein said one of said pair is darker than the other of said pair.

4. The computer-implemented method according to claim 2, wherein the outline applying step further comprises the step of:
    adding an outline pixel to each one of a pair of anti-aliased pixels, when the color of each one of said pair of anti-aliased pixels are equal.

5. The computer-implemented method according to claim 1, further comprising the step of:
    applying an anti-aliasing filter so as to create said anti-aliased pixels for said annotation subsequent to said outline applying step.

6. The computer-implemented method according to claim 5, wherein the outline applying step further comprises the step of:
    adding an outline pixel juxtaposed to one of a pair of anti-aliased pixels, wherein said one of said pair is darker than the other of said pair.

7. The computer-implemented method according to claim 5, wherein the outline applying step further comprises the step of:
    adding an outline pixel to each one of a pair of anti-aliased pixels, when the color of each one of said pair of anti-aliased pixels are equal.

8. The computer-implemented method according to claim 1, wherein colors resulting from the anti-alias applying step are no lighter than the outline color of said annotation.

9. The computer-implemented method according to claim 1, wherein said outline applying step further comprises the steps of:
    determining an original color of a pixel of said pixels;
    determining a color of said annotation;
    determining the outline color to which to set said pixel as based on a combination of said original color and said annotation color.

10. The computer-implemented method according to claim 1, wherein the outline applying step further comprises the step of:
    adding at least two outline pixels to each pixel of said annotation.

11. The computer-implemented method according to claim 1, wherein said receiving step includes capturing an annotation from user input.

12. The computer-implemented method according to claim 1, wherein said receiving step includes retrieving said annotation from a memory.

13. The computer-implemented method according to claim 1, wherein at least two of said first displayable thickness, said second displayable thickness, and said third displayable thickness are the same.

14. The computer-implemented method according to claim 1, wherein said first displayable thickness, said second displayable thickness, and said third displayable thickness are different from each other.

15. A computer-readable medium having a program stored thereon, said program used in conjunction with a system having a display for displaying a page, said program comprising the steps of:
    receiving an annotation;
    applying one of a group of some pixels forming outline pixels and a group of some pixels forming anti-aliased pixels to at least some pixels surrounding said annotation;
    applying the other of said group of some pixels forming outline pixels and said group of some pixels forming anti-aliased pixels; and
    displaying said annotation with a first displayable thickness and said outline pixels with a second displayable thickness and said anti-aliased pixels with a third displayable thickness on said display, such that said outline pixels are visible at least next to said annotation.

16. The computer-readable medium having said program according to claim 15, further comprising the step of:
    applying an anti-aliasing filter to said annotation prior to said outline pixel applying step.

17. The computer-readable medium having said program according to claim 16, wherein the outline applying step further comprises the step of:
    adding an outline pixel juxtaposed to one of a pair of anti-aliased pixels, wherein said one of said pair is darker than the other of said pair.

18. The computer-readable medium having said program according to claim 16, wherein the outline applying step further comprises the step of:
    adding an outline pixel to each one of a pair of anti-aliased pixels, when the color of each one of said pair of anti-aliased pixels are equal.

19. The computer-readable medium having said program according to claim 15, further comprising the step of:
    applying an anti-aliasing filter to said annotation subsequent to said outline pixel applying step.

20. The computer-readable medium having said program according to claim 19, wherein the outline applying step further comprises the step of:
    adding an outline pixel juxtaposed to one of a pair of anti-aliased pixels, wherein said one of said pair is darker than the other of said pair.

21. The computer-readable medium having said program according to claim 19, wherein the outline applying step further comprises the step of:
    adding an outline pixel to each one of a pair of anti-aliased pixels, when the color of each one of said pair of anti-aliased pixels are equal.

22. The computer-readable medium having said program according to claim 15, wherein a color of the anti-aliased pixels to be applied is no lighter than the outline color of said annotation.

23. The computer-readable medium having said program according to claim 15, wherein said outline applying step further comprises the steps of:
- determining an original color of a pixel of said pixels;
- determining a color of said annotation;
- determining the color of anti-aliased pixels;
- determining a color to which to set said anti-aliased pixels as based on a combination of outline color and said annotation color.

24. The computer-readable medium having said program according to claim 23, wherein the outline applying step further comprises the step of:
adding at least two outline pixels to each pixel of said annotation.

25. The computer-readable medium having said program according to claim 23, wherein said receiving step includes capturing an annotation from user input.

26. The computer-readable medium having said program according to claim 23, wherein said receiving step includes retrieving said annotation from a memory.

27. The computer-readable medium having said program according to claim 15, wherein at least two of said first displayable thickness, said second displayable thickness, and said third displayable thickness are the same.

28. The computer-readable medium having said program according to claim 15, wherein said first displayable thickness, said second displayable thickness, and said third displayable thickness are different from each other.

* * * * *